United States Patent
Ellappan et al.

(10) Patent No.: US 12,057,036 B2
(45) Date of Patent: Aug. 6, 2024

(54) PREDICTING THERMAL STATES IN CONNECTED DEVICES TO PROVIDE EDGE PROCESSING

(71) Applicant: QUALCOMM Incorporated, San Diego, CA (US)

(72) Inventors: Parthiban Ellappan, Virudhunagar (IN); Danlu Zhang, San Diego, CA (US); Peerapol Tinnakornsrisuphap, San Diego, CA (US); Jiaying Pan, San Diego, CA (US); Xiaoxin Zhang, Sunnyvale, CA (US); Brian Momeyer, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/931,818

(22) Filed: Sep. 13, 2022

(65) Prior Publication Data

US 2024/0087486 A1 Mar. 14, 2024

(51) Int. Cl.
*G09G 3/00* (2006.01)
*G06F 1/16* (2006.01)
(Continued)

(52) U.S. Cl.
CPC ............. *G09G 3/001* (2013.01); *G06F 1/163* (2013.01); *G06F 1/206* (2013.01); *H04L 67/125* (2013.01);
(Continued)

(58) Field of Classification Search
None
See application file for complete search history.

(56) References Cited

U.S. PATENT DOCUMENTS

2016/0262143 A1* 9/2016 Breuer .............. H04W 52/0258
2018/0224871 A1* 8/2018 Sahu ....................... G06F 1/206
(Continued)

OTHER PUBLICATIONS

Zhang X., et al., "A Smartphone Thermal Temperature Analysis for Virtual and Augmented Reality", 2020, 6 Pages.
(Continued)

*Primary Examiner* — Jeffrey J Chow
(74) *Attorney, Agent, or Firm* — Marbury Law Group, PLLC

(57) ABSTRACT

Embodiments include methods for managing component temperatures in wearable devices by a remote computing device, such as an edge server, instructing changes in wearable device component processing loads, operations or operating modes. Methods performed in a wearable device receiving data from an edge server may include obtaining a plurality of temperature measurements from a plurality of hardware components, transmitting the temperature measurements to the edge server, receiving an instruction related to operations of an application executing on the processor of the wearable device, and adjusting an operating parameter based on the received instruction. Methods performed in the edge server include receiving the temperature measurements from the wearable device, identify one or more adjustments to operations of the plurality of hardware components based on the plurality of temperature measurements, and sending the wearable device an instruction to adjust operations of at least one of the plurality of hardware components.

28 Claims, 13 Drawing Sheets

(51) Int. Cl.
  *G06F 1/20*       (2006.01)
  *H04L 67/125*     (2022.01)
(52) U.S. Cl.
  CPC ... *G09G 2320/041* (2013.01); *G09G 2320/06* (2013.01); *G09G 2330/045* (2013.01); *G09G 2350/00* (2013.01); *G09G 2370/02* (2013.01); *G09G 2370/10* (2013.01); *G09G 2370/16* (2013.01)

(56) References Cited

U.S. PATENT DOCUMENTS

| | | | |
|---|---|---|---|
| 2018/0329465 A1* | 11/2018 | Tavakoli | G06F 1/3234 |
| 2019/0064891 A1 | 2/2019 | Ashwood et al. | |
| 2019/0212026 A1* | 7/2019 | Kim | F24F 11/65 |
| 2020/0008152 A1 | 1/2020 | Stauffer et al. | |
| 2020/0112625 A1 | 4/2020 | Hancock et al. | |
| 2020/0379550 A1 | 12/2020 | Uhm et al. | |
| 2021/0165442 A1 | 6/2021 | Jung et al. | |
| 2021/0281638 A1 | 9/2021 | Vrcelj et al. | |
| 2022/0124304 A1 | 4/2022 | Kulkarni et al. | |
| 2022/0253093 A1 | 8/2022 | Berliner et al. | |
| 2022/0357779 A1* | 11/2022 | Pingili | G06F 1/203 |
| 2023/0112115 A1* | 4/2023 | Zandian | G06F 9/4893 |
| | | | 700/300 |

OTHER PUBLICATIONS

International Search Report and Written Opinion—PCT/US2023/028683—ISA/EPO—Nov. 17, 2023 15 pages.

* cited by examiner

PREDICTING THERMAL STATES IN CONNECTED DEVICES TO PROVIDE EDGE PROCESSING

BACKGROUND

Long Term Evolution (LTE), Fifth Generation (5G) New Radio (NR), and other communication technologies enable improved communication and data services. One such service is augmented reality (AR) or extended reality (XR) which demands low latency and high-bandwidth for real-time processing. Some of this data bandwidth may be allocated to other transmission networks, such as a wireless local area network (WLAN) which may be a Wi-Fi network with a connection to the Internet. Some of this real-time processing may be allocated to the edge computing resources of a network. However, the high loads on the processor, graphics unit, and transceiver at the AR device may result in the device overheating or becoming too hot for the user.

SUMMARY

Various aspects include systems and methods performed by a processor of a wearable device for managing component temperatures in conjunction with an edge device. Various aspects may include obtaining a plurality of temperature measurements from a plurality of hardware components of the wearable device, transmitting, from the wearable device to the network node, the plurality of temperature measurements correlated to the plurality of hardware components, receiving an instruction from the network node related to operations of an application executing on the processor of the wearable device; and adjusting an operating parameter of the wearable device based on the instruction received from the network node.

In some aspects, the application executing on the processor of the wearable device may be using a data stream, the instruction received from the network node may adjusts execution of the application; and adjusting the operating parameter of the wearable device based on the instruction received from the network node may include adjusting an operation of the processor executing the application based on the instruction. In some aspects, adjusting the operating parameter of the wearable device may include one of receiving more rendered elements of the graphics from the network node, rendering more elements of the graphics by the processor; or rendering more elements of the graphics by the processor and receiving more rendered elements of the graphics from the network node. In some aspects, the application executing on the processor of the wearable device may be an extended reality application, the data stream received from the network node may include data or graphics to be presented in an extended reality display; and adjusting the operation of the processor executing the application based on the instruction may include adjusting processing of the data or graphics to be presented in the extended reality display.

In some aspects, adjusting the operating parameter of the wearable device may include at least one of adjusting a downlink data transmission rate of a transceiver of the wearable device, adjusting a sampling rate of an inertial measurement unit of the wearable device, adjusting sensitivity of the inertial measurement unit of the wearable device, adjusting an output resolution of the inertial measurement unit of the wearable device, adjusting gyroscope measurements of the inertial measurement unit of the wearable device, adjusting graphical display quality in a display of the wearable device, adjusting a graphical display area in the display of the wearable device; or adjusting video compression parameters including frame rate, a ratio of predictive frames to full frames, or compression block size.

In some aspects, transmitting the plurality of temperature measurements may include transmitting the plurality of temperature measurements via at least one control message of a Wi-Fi protocol; or transmitting the plurality of temperature measurements via at least one radio resource control message of a 5G protocol.

In some aspects, transmitting the plurality of temperature measurements may include transmitting the plurality of temperature measurements via at least one control message, each of the at least one control message including a control bit for indicating to the network node that the at least one control message contains the plurality of temperature measurements in a payload, and each of the at least one control message including a plurality of component identifiers mapped to the plurality of temperature measurements.

Further aspects include a wearable device having a processor configured to perform one or more operations of any of the methods summarized above. Further aspects include processing devices for use in a wearable device configured with processor-executable instructions to perform operations of any of the methods summarized above. Further aspects include a non-transitory processor-readable storage medium having stored thereon processor-executable instructions configured to cause a processor of a wearable device to perform operations of any of the methods summarized above. Further aspects include a wearable device having means for performing functions of any of the methods summarized above. Further aspects include a system on chip for use in a wearable device that includes a processor configured to perform operations of any of the methods summarized above.

Further aspects include methods performed by an edge server streaming data to a wearable device, including receiving from the wearable device a plurality of temperature measurements corresponding to a plurality of hardware components of the wearable device, identifying one or more adjustments to an operation of the plurality of hardware components based on the plurality of temperature measurements; and transmitting to the wearable device an instruction configured to cause the wearable device to adjust operation of at least one of the plurality of hardware components.

Some aspects may further include computing, at the edge server, at least one aspect of a graphical display of the wearable device based on the plurality of temperature measurements. Some aspects may further include predicting a temperature value of at least one of the plurality of hardware components of the wearable device; and computing, at the edge server, at least another aspect of the graphical display of the wearable device based on the predicted temperature value, the predicted temperature value being separate from the plurality of temperature measurements. Some aspects may further include adjusting at least one parameter of a communication connection between the edge server and the wearable device; or adjusting at least one parameter of graphical rendering performed at the edge server for the wearable device.

In some aspects, the plurality of temperature measurements may include individual temperature measurements for each of the plurality of hardware components of the wearable device. In some aspects, the plurality of temperature measurements may be received in one or more control message packets via a 5G protocol-based wireless link or a Wi-Fi protocol-based wireless link.

Some aspects may further include executing a application programming interface (API) for balancing processing burdens between the edge server and the wearable device based on the received plurality of temperature measurements. In some aspects, the one or more adjustments may be configured for execution at the wearable device to control a first hardware component of the plurality of hardware components to reduce thermal emissions at the first hardware component, and in which the one or more instructions are based on a comparison of a temperature value for the first hardware component, received with the plurality of temperature measurements, with a temperature threshold for the first hardware component.

Further aspects include an edge server configured to perform one or more operations of any of the methods summarized above. Further aspects include a non-transitory processor-readable storage medium having stored thereon server-executable instructions configured to cause an edge server to perform operations of any of the methods summarized above.

DETAILED DESCRIPTION

Figure 1A:
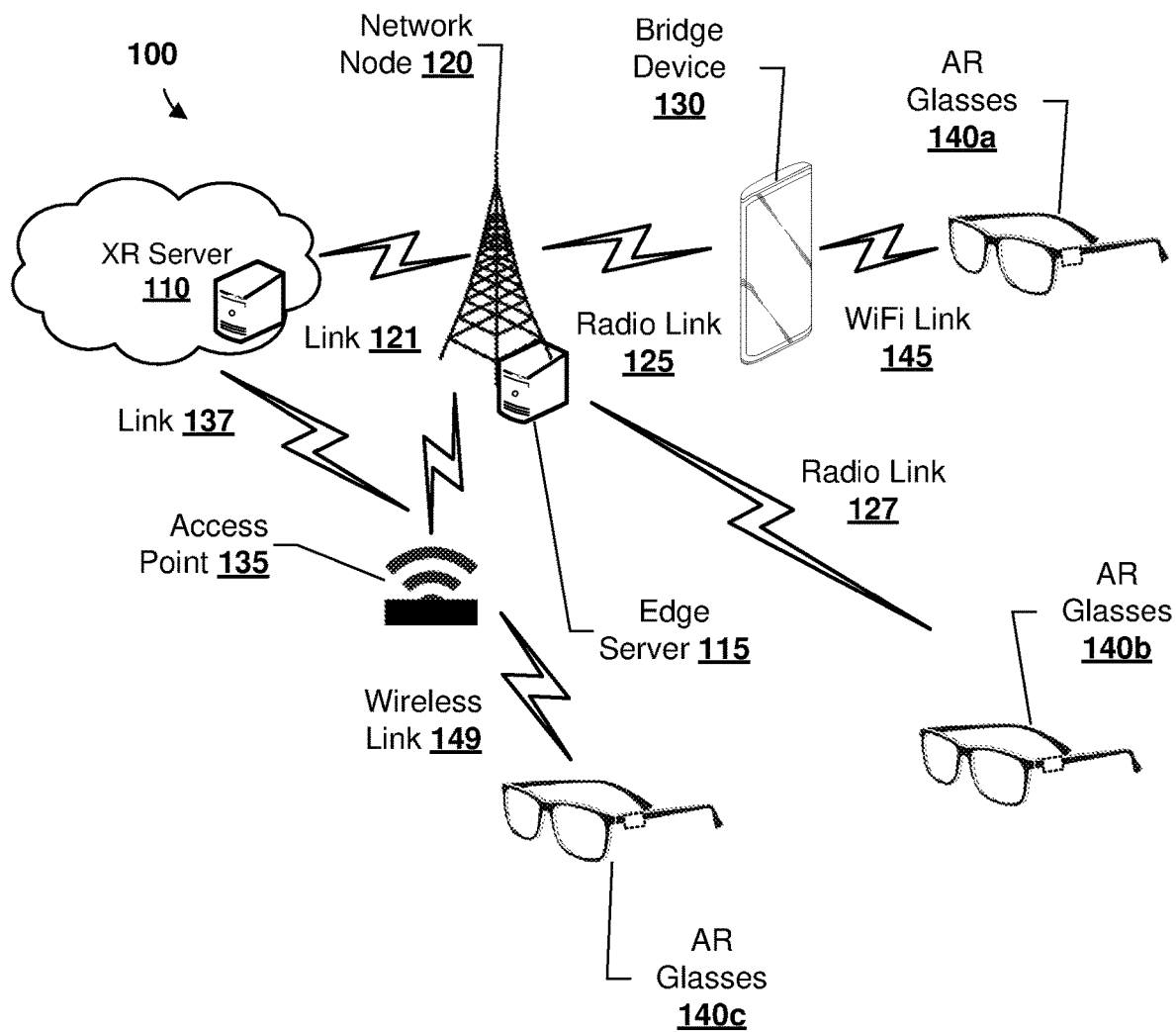
FIG. 1A is a system block diagram illustrating an example communications system suitable for implementing any of the various aspects herein.

Various embodiments and implementations will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various implementations include systems and methods for gathering thermal data on individual components within a mobile computing device and/or user wearable computing device and reporting the thermal data associated with specific hardware components to a remote server or edge server in a format that enables the remote server or edge server to recognize when one or more components are reaching a thermal limit and to determine an appropriate corrective action that can be taken to avoid exceeding thermal limits. Various embodiments also include methods that may be implemented in a remote server or edge server for protecting a mobile computing device and/or user wearable computing device that include receiving a plurality of thermal data corresponding to specific hardware components of the mobile computing device and/or user wearable computing device, recognizing when one or more components are approaching a thermal limit, determining an action that can be taken in the remote server or edge server and/or in the mobile computing device and/or user wearable computing device to prevent exceeding a thermal limit, including predicting thermal effects of such actions, and taking an action to implement the action.

The term "user equipment" (UE) is used herein to refer to any one or all of wireless communication devices, wireless appliances, cellular telephones, smartphones, portable computing devices, personal or mobile multi-media players, laptop computers, tablet computers, smartbooks, ultrabooks, palmtop computers, wireless electronic mail receivers, virtual reality displays, extended reality displays, multimedia Internet-enabled cellular telephones, wireless router devices, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

Augmented reality (AR) or extended reality (XR) promises to be the next frontier of media by adding, extending, or overlaying additional features to the real world the sense around us. AR and XR media may primarily be audiovisual, but can also include textual overlays. In some implementations, a portable user device providing an extended reality experience may be AR and XR glasses or goggles that include a display positioned in front of the user's eyes so as to overlay images and information over the real world. As AR and XR glasses or goggles are wearable, and issues with overheating are particularly relevant to wearable devices, the term "wearable device" is used herein to refer generally to devices implementing various embodiments. Further, the term "AR glasses" will be used in the following descriptions as a representative example of wearable devices for viewing AR and XR media and is intended to encompass AR glasses, XR glasses, AR goggles, XR goggles, virtual reality (VR) googles and similar wearable devices.

In some implementations, AR/XR/VR viewing devices, such as AR glasses, work in conjunction with a bridge communication device (referred to herein as an "bridge device"), such as a smartphone, tablet computer, personal computer, which are referred to herein as user equipment" or "UE." In such implementations, the bridge device or UE may serve as a communication hub for receiving AR/XR/VR media from a remote server or edge server, such as via a 5G communication link, and relaying the media data to the AR glasses via a local wireless communication link, such as Wi-Fi or Bluetooth. Similarly, the bridge device or UE may serve as a communication hub for transmitting an upload data stream (e.g., of pose, gaze and imagery data) from the AR glasses to the remote server or edge server. In some implementations, the bridge device or UE may perform some of the processing of downloaded data while other processing is performed by a processor or processors within the AR glasses.

AR glasses may project or display one or more graphics on lenses through which the user can also see the real-world, and as well as emit sounds from the frame or temples that the user can hear. The AR glasses may also allow the user to see through the lenses to the real world at the same time as graphics are displayed on the lenses. In many AR and XR application, the augmented media (images, text and/or sounds) may be streamed to a bridge device or UE (e.g., a smart phone) and/or directly to AR glasses from an external server and/or an edge server. In some operating modes, the media may be downloaded in a raw format that requires processing by the UE and/or the AR glasses in order to render the imagery presented on the lenses of the AR glasses. In other operating mode, the media may be generated or partially generated at an external server and/or edge server, with the resulting image should be transmitted to the UA and/or AR glasses for rendering on the lenses.

The audiovisual media that is presented on lenses of AR glasses may be generated at the AR glasses and/or UE, or generated, at least in part, at remote servers and at servers or similar computing devices positioned in networks near wireless network access points referred to herein as "edge servers." The user experience may be delivered by a shared extended reality application that is hosted on one or more external servers and/or edge servers and the user device devices (i.e., AR glasses and bridge device or UE), with the user devices connected to the servers via wireless connection (e.g., 5G, LTE, Wi-Fi).

Because AR and XR media are added to the user experience as a part of the real world, the generation and rendering of this media necessarily includes the need to consider real-time aspects, such as the user's gaze as well images of the real world as seen by the user. In order to appropriately align the AR and XR display graphics with the real world seen through the lenses, the AR glasses may monitor the pose, orientation, eye-direction, and movement of the user and transmit that information to an external server and/or edge server that is streaming AR and XR media content for rendering on the AR glasses. In some embodiments, the AR glasses may include one or more cameras that image the real world, with such imagery uploaded to the external server and/or edge server for use in identifying appropriate AR and XR media to be downloaded to the UE and/or AR glasses. Thus, in addition to downloading AR and XR media content the UE and/or AR glasses, external servers and/or edge servers receive and upload stream of data regarding where the user is looking through the AR glasses, and in some cases, what the user is seeing.

As a part of the rendering process, an external server may require the pose, orientation, eye direction, or movement of the user before beginning calculations. Accordingly, where some of the extended reality processing is transferred to an external server, the timing between the upload of pose information and the download of completed renderings may have specific latency demands. To address this, the wearable extended reality device (e.g., AR glasses) may utilize computing resources on the edge of the network that the UE it is connected to. This concept may be called edge computing or edge resources. Therefore, the edge computing resources may render some or all of the graphics required by the extended reality device (e.g., AR glasses) to reduce latency. These edge resources may process the more latency-sensitive graphics and cloud servers may process other graphics for the user device. This balancing of latency by processing at the user device, at an edge server, or at a cloud server requires scheduling adjustments and bandwidth allocations between the user device and the network.

The addition of audiovisual overlays and information to the real world in real time requires substantial computer processing power in AR and XR applications. In AR and XR applications in which the necessary computations and rendering requires extensive processing resources, the processors responsible, as well as the transceiver communicating data, may generate excessive heat and as a result could get quite hot. In user wearables, such as AR and XR glasses and goggles, this heat may make such wearable uncomfortable and could pose a risk of injury to the user. Therefore, the temperatures permitted in such wearable devices may be limited to temperature thresholds in regulations as well as comfort consideration.

UE devices and AR glasses typically include a large number of temperature sensors. For example, application processor may include multiple temperature sensors deployed in different portions of the SOC, including one or more temperatures sensors within core processing units (CPU) and graphics processing unit (GPU). Also one or more temperature sensors may be included in wireless transceivers, modems, power amplifiers and sensor units, such as inertial measurement units (IMU). Each of these components may have maximum temperature thresholds selected to prevent discomfort or injury to users as well as avoid shortening the functional lifetime. Data from the large number of temperature sensors within UE devices and AR glasses our using conventional methods for regulating device temperatures implemented within such devices. However, full range of temperature data and information identifying the components corresponding to each temperature are not shared with external devices, such as external servers and/or edge servers.

One potential method for reducing temperatures in user wearable devices involved in AR and XR applications involves shifting some of the processing load from one element or computing device to another to reduce the processing load on up overheating processor or circuit element. For example, a UE and/or XR glasses could initiate offloading of the generation of images from the UE and/or XR glasses to an external server and/or edge server, which may perform the processing necessary to generate images or partial images, and then transmit the generated images to the UE and/or AR glasses for rendering on the AR glasses lenses. However, shifting processing of imagery to an external server or edge server may increase the data that must be received by the UE and XR glasses transceivers, which may increase the heat generated by the transceiver of the device. Accordingly, there is a need to balance the heat generated by various components within user wearable devices when taking actions to avoid exceeding a maximum temperature threshold, including the need to consider consequences of transferring processing loads to external computing devices, such as edge servers, on various wearable device components to increase safety, user comfort, and device lifetime.

By transmitting temperature measurements results of multiple components of different parts of the UE and/or XR glasses to a remote server and/or edge server, the remote server and/or edge server can recognize over-temperature conditions and identify preventive actions that can be tailored to the location of high temperatures in the XR devices, while balancing processing loads between the various computing devices to achieve best overall temperature performance. Thus, various embodiments can improve the regulation of temperature within user devices receiving download services from an external server and/or edge server, particularly AR, XR and VR applications executing on a UE and/or AR/XR/VR wearable devices, such as XR glasses.

FIG. 1A is a system diagram illustrating an example communication system 100 including a network providing a communication link between AR glasses 140a-c and a XR server 110. As used herein, the terms "network," "system," "wireless network," "cellular network," and "wireless communication network" may interchangeably refer to a portion or all of a wireless network of a carrier associated with a wireless device and/or subscription on a wireless device. The communication system 100 may include a number of network nodes 120 and other network entities, such as base stations and access points 135. A network node 120 is an entity that communicates with user devices (e.g., AR glasses 140) and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like.

As described above, the AR glasses 140a-140c may require additional processing that is performed on the XR server 110 and correspondingly the XR server 110 may require local information from the AR glasses 140a-c. Therefore, the example communication system 100 may include an uplink channel and downlink channel or uplink resources and downlink resources. One or more of the links or connections within the example communication system 100 may be wireless or wired. The devices illustrated in FIG. 1A are merely examples and may be other computing devices or communication devices.

As illustrated, the AR glasses 140a may connect via Wi-Fi link 145 to a bridge device 130, such as a UE, which may connect via a radio link 125 to a network node 120, which may connect via link 121 to XR server 110. The radio link 125 may be provided over a 5G New Radio (NR) network, or any other suitable network, such as a Long-Term Evolution (LTE) network or later generation network. Therefore, the reference to a 5G network and 5G network elements in the following descriptions is for illustrative purposes and is not intended to be limiting. The communication system 100 may be a heterogeneous network including peer-to-peer links, relay links, and one or more links to a network node (e.g., network node 120). The XR server 110 may be provided on the backend and connected to the network node 120 via a backhaul link or other network link. Further and alternatives details regarding the 5G radio system are described with reference to FIG. 1B.

The network node 120 may connect to an edge server 115 or may be co-located with the edge server 115. The edge server 115 may be at least one network level closer to the AR glasses 140 than the XR server 110 and may have less latency in communications with the AR glasses 140 relative to the XR server 110. The placement of edge computing resources (e.g., edge servers 115) is described in more detail in FIG. 1B.

In the example communication system 100, the AR glasses 140a may include a Wi-Fi transceiver to connect to the bridge device 130 (e.g., a UE) and other Wi-Fi resources (e.g., access point 135) where the Wi-Fi transceiver transmits and receives signals over an uplink and downlink defined one of the Wi-Fi standard protocols. The bridge device 130 may include the Wi-Fi transceiver for communication with the AR glasses 140 and a 5G transceiver for communication with the network node 120. The radio link 125 may be a cellular wireless link defined by the 5G standard protocol or other suitable protocol.

In the consumer augmented reality space, the phone-to-glass (P2G) architecture relates to a system in which a phone acts as a bridge device 130 to relay extended reality data streams between the XR server 110 and the AR glasses 140 using 5G and Wi-Fi links. For example, the illustrated AR glasses 140 connect to the bridge device 130 via a Wi-Fi communication link, which may reduce product size, weight, cost, and power consumption by the associated wireless transceiver. The phone bridge device 130 may provide better 5G connectivity with its larger form factor and antenna size than could the AR glasses 140. Additionally, the AR glasses 140 can help save power in a long-distance scenario since the long leg of the uplink traffic would be handled by the phone bridge device 130, which will typically have a larger battery. Thus, the phone-to-glass architecture may improve the user experience over AR glasses hundred 40 alone by combining two separate wireless protocols via the bridge device 130 supporting the uplink communications that provide pose, gaze and imagery data to the XR server and the downlink communications that provide AR/XR/VR media for rendering on the AR glasses 140.

In the example communication system 100, the AR glasses 140b may include a radio transceiver (e.g., 5G) to communicate via radio link 127 with a network node 120 and edge server 115. The reduced hops in the link (e.g., direct link) with the network node 120 may reduce latency with the edge server 115. On the other hand, the transceiver power requirements and thermal emissions of the transceiver of the AR glasses 140b may be higher for this type of connection. AR glasses 140b may simultaneously or concurrently connect with a bridge device 130 or access point 135 via Wi-Fi links.

The AR glasses 140c may connect to a wireless access point 135 via Wi-Fi link 149. The access point 135 may be a Wi-Fi-enabled network node and may connect to XR server 110 and edge server 115 via wired or wireless connections 137. That is, communication network 100 may include heterogeneous wireless protocols and may include wired, fiber, and wireless links. AR glasses 140c may concurrently connect with a bridge device 130 via Wi-Fi links in a peer-to-peer arrangement and may connect via radio wireless link to network node 120. The aspects of AR glasses 140a-c are interchangeable and combinable and are described here as examples of user access to the network.

Various embodiments may make use of various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement Enhanced Data rates for global system for mobile communications (GSM) Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

In various communication network implementations or architectures, a network node may be implemented as an aggregated base station, as a disaggregated base station, an integrated access and backhaul (IAB) node, a relay node, a sidelink node, etc., such as a virtualized Radio Access Network (vRAN) or Open Radio Access Network (O-RAN). Also, in various communication network implementations or architectures, a network device (or network entity) may be implemented in an aggregated or monolithic base station architecture, or alternatively, in a disaggregated base station architecture, may include one or more of a Centralized Unit (CU), a Distributed Unit (DU), a Radio Unit (RU), a near-real time (RT) RAN intelligent controller (RIC), or a non-real time RIC. Each network device may provide communication coverage for a particular geographic area. In 3GPP, the term "cell" can refer to a coverage area of a network device, a network device subsystem serving this coverage area, or a combination thereof, depending on the context in which the term is used.

A network node 120 may provide communication coverage for a macro cell, a pico cell, a femto cell, another type of cell, or a combination thereof. A macro cell may cover a relatively large geographic area (for example, several kilometers in radius) and may allow unrestricted access by user devices with service subscription. A pico cell may cover a relatively small geographic area and may allow unrestricted access by user devices with service subscription. A femto cell may cover a relatively small geographic area (for example, a home) and may allow restricted access by user devices having association with the femto cell (for example, user devices in a closed subscriber group (CSG)). A network node for a macro cell may be referred to as a macro node or macro base station. A network node for a pico cell may be referred to as a pico node or a pico base station. A network node for a femto cell may be referred to as a femto node, a femto base station, a home node or home network device. The terms "network device," "network node," "eNB," "base station," "NR BS," "gNB," "TRP," "AP," "node B," "5G NB," and "cell" may be used interchangeably herein.

In some examples, a cell may not be stationary, and the geographic area of the cell may move according to the location of a network device. In some examples, the network nodes may be interconnected to one another as well as to one or more other network devices (e.g., base stations or network nodes (not illustrated)) in the communication system 100 through various types of backhaul interfaces, such as a direct physical connection, a virtual network, or a combination thereof using any suitable transport network.

The network node 120 may communicate with the backend servers (e.g., XR server 110) over a wired or wireless communication link (e.g., link 121). The bridge device 130 may communicate with the network node 120 over a wireless communication link 125. A wired communication link for the backend (e.g., link 121) may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communication system 100 also may include relay stations that may receive a transmission of data from an upstream station (for example, a network node or a UE) and send a transmission of the data to a downstream station (for example, a UE or a network node). A relay station may be a UE that can relay transmissions for other UEs. A network controller may couple to a set of network nodes and may provide coordination and control for these network nodes. The network controller may communicate with the network nodes via a backhaul, midhaul, and/or fronthaul. The network nodes also may communicate with one another, for example, directly or indirectly via a wireless or wireline backhaul.

The communication system 100 or 160 may be a heterogeneous network that includes network devices of different types, for example, macro network devices, pico network devices, femto network devices, relay network devices, etc. These different types of network devices may have different transmit power levels, different coverage areas, and different impacts on interference in communication system 100. For example, macro nodes may have a high transmit power level (for example, 5 to 40 Watts) whereas pico network devices, femto network devices, and relay network devices may have lower transmission power levels (for example, 0.1 to 2 Watts). The bridging devices (e.g., 130, 135) may be dispersed throughout communication system 100 and may be stationary or mobile. A bridge device 130 also may be referred to as an access terminal, a terminal, a mobile station, a subscriber unit, a user station, wireless device, etc.

The wireless communication links (e.g., radio link 125 or radio link 127) may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short-range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz).

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more bridge devices 130 may communicate directly using one or more sidelink channels (for example, without using a network node 120 as an intermediary to communicate with one another). For example, bridge device 130 may communicate with other devices (e.g., AR glasses 140) using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the bridge device 130 may perform scheduling operations, resource selection operations, as well as other operations described elsewhere herein as being performed by the network node 120.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or components) performing base station functionality, may be implemented in an aggregated or disaggregated architecture. For example, a base station (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or as a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, DUs and RUs also can be implemented as virtual units, referred to as a virtual central unit (VCU), a virtual distributed unit (VDU), or a virtual radio unit (VRU).

Base station-type operations or network design may consider aggregation characteristics of base station functionality. For example, disaggregated base stations may be utilized in an integrated access backhaul (IAB) network, an open radio access network (O-RAN) (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 1B:
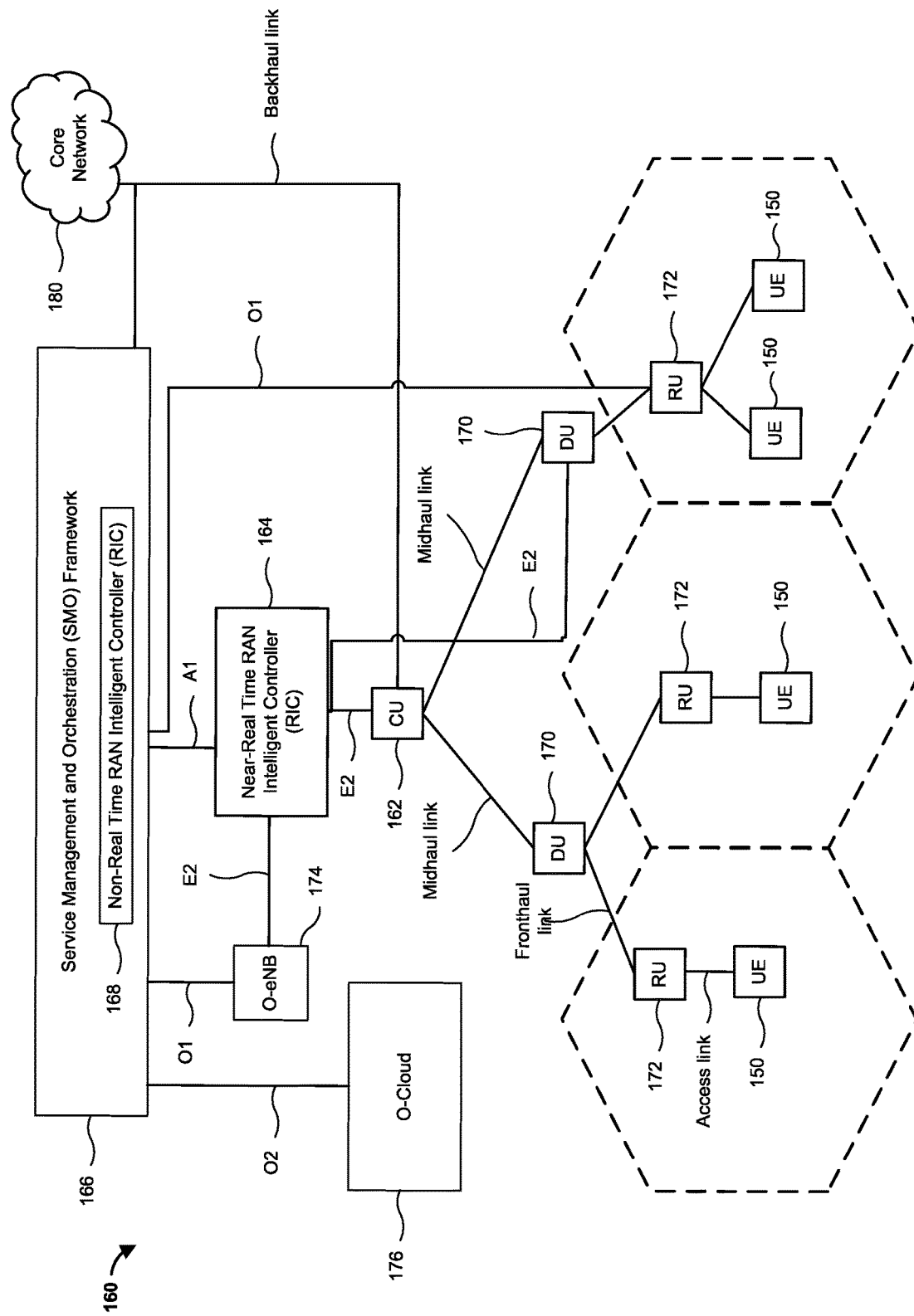
FIG. 1B is a system block diagram illustrating an example disaggregated base station architecture suitable for implementing any of the various embodiments.

FIG. 1B is a system block diagram illustrating an example disaggregated base station 160 architecture suitable for implementing any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 150 via one or more radio frequency (RF) access links. In some implementations, the UE 150 may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

An edge server 115 may be co-located or directly connected to an o-eNB 174, an RU 172, a DU 170, or a CU 162. The latency for extended reality applications may depend on which edger server is being used. An XR server 110 may be located in the core network 180, or provided as part of the SMO framework 166, or a CU 162, for example. Depending on the extended reality application, the XR server 110 may be an asset of the application provider and disposed wherever that provider is located. An edge server 115 of communication network 160 or 100 may provide cross-platform and cross-application processing resources and, if authorized, manage one or more aspects of load balancing between devices and their external processing resources.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based RAN architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 2:
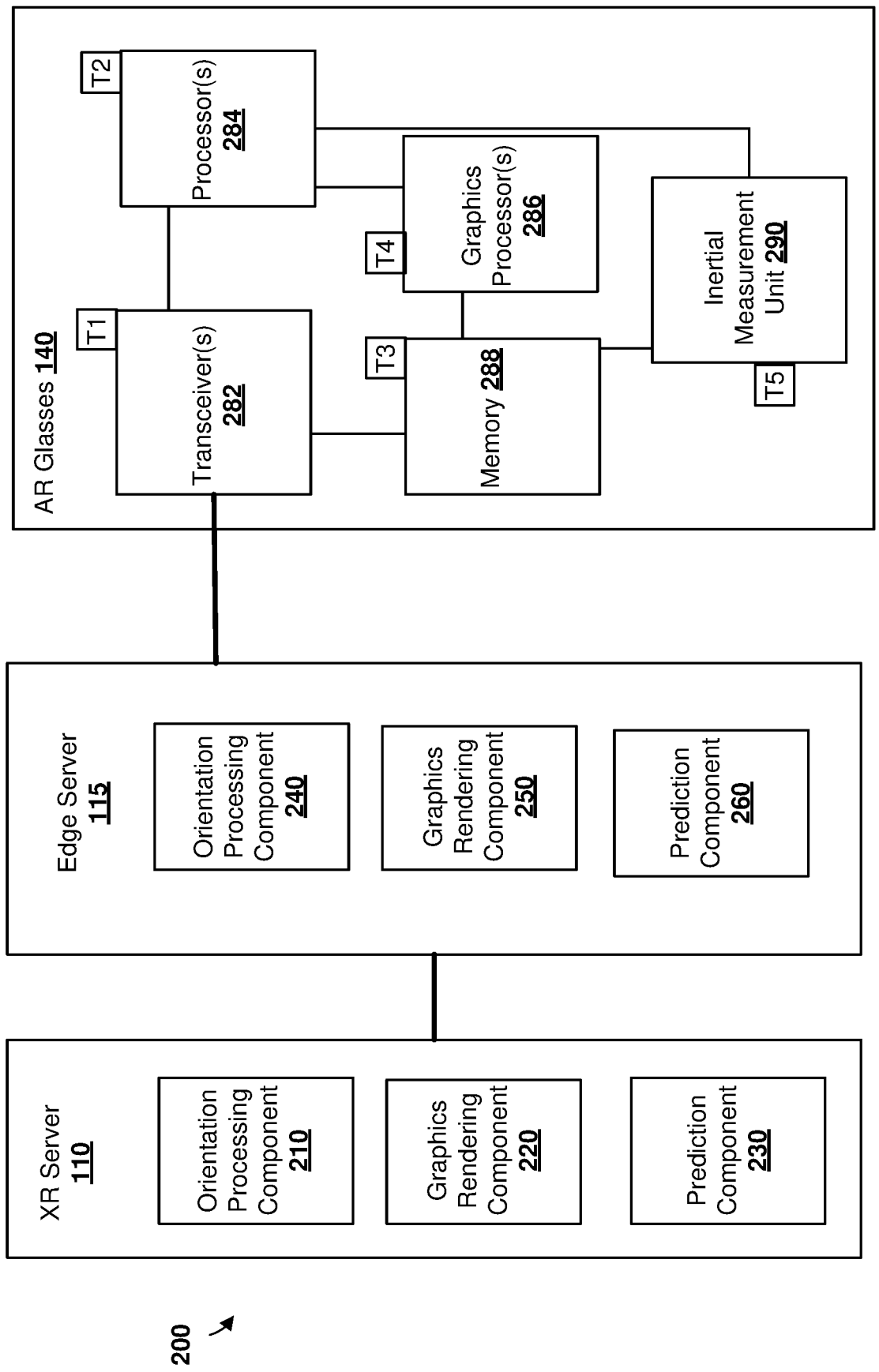
FIG. 2 is a system block diagram illustrating an example connections according to various aspects herein.

FIG. 2 is a system block diagram illustrating portions of a processing system 200 that provides processing for an extended reality experience delivered by a wearable (e.g., AR glasses 140). With reference to FIGS. 1A-2, the system illustrated in FIG. 2 may include one or more of the communication connections, network nodes, access points, or routing devices of FIG. 1A-1B, although these are not shown in FIG. 2 for clarity. Likewise, the XR server 110, edge server 115, and AR glasses 140 (or other wearables) as described herein may include the components illustrated in FIG. 2. As shown, the XR server 110, edge server 115, and AR glasses 140 may each have graphic processing capabilities, orientation calculation capabilities, and each may have thermal condition prediction capabilities. In the case of the XR server 110 and the edge server 115, these capabilities may be provided to support one or more AR glasses 140 on the network.

An AR application may be adapted to distribute, allocate or split various processing tasks between the XR server 110, the edge server 115, the bridge device 130 (e.g., UE) and the AR glasses 140. At start up, the AR application May make contact with the XR server 110 and edge server 115. The XR server 110 may determine a traffic offset or burst traffic offset for media generated at the XR server 110 or edge server 115. The network node 120 or the core network 180 may determine the burst traffic offset (i.e., timing information for transmission of the rendered data). The traffic offset or burst traffic offset may be determined such that the traffic from the XR server 110 or edge server 115 is scheduled to be sent when the transmission resources (e.g., 5G and Wi-Fi) are available. The burst traffic offset calculated at the XR server 110 or edge server 115 may be transmitted to the network node 120 and to the AR glasses 140 to inform and drive the resource allocation in the communication chain. Accordingly, the XR server 110 or edge server 115 may initialize and guide the resource allocation within system 200 based on graphics rendering timing and traffic offsets. These aspects are described in more detail in relation to FIG. 5.

The AR glasses 140 may include one or more transceivers 282, one or more processors (CPUs) 284, graphics processors (GPU) 286, memory 288, and an inertial measurement unit (IMU) 290. The IMU 290 is described in more detail with respect to sensor data component 322 of FIG. 3A. One or more of these processing units 282-290 may include a temperature measurement component (e.g., T1) that connects to memory and stores local temperature readings corresponding to various components within the respective unit. Any one of the components of the AR glasses 140 (e.g., transceivers 282) may connect to one or more of the other components of the glasses. As also described with reference to FIG. 8, one or more of the components (e.g., processors 284) may include internal temperature management, power management, and load balancing. Such components may be configured to receive instructions to leverage the local temperature and power management capabilities to coordinate with other components.

The temperature sensors T1-T5 may measure the temperature of the corresponding component or a portion thereof. Each of the components 282-290 of AR glasses 140 may include one or more local temperature sensors. Further, the AR glasses 140 may include temperature sensors in the housing of the glasses or the frame to monitor one or more key comfort points (e.g., behind the user's ears) or to monitor the battery temperature. The AR glasses 140 may process the component-specific temperature sensors and local sensors to identify a temperature profile of the device. The memory 288 may store one or more temperature thresholds for one or more of the components 282-290. These temperature thresholds may be operational temperature thresholds to prevent damage to the hardware, comfort thresholds for the user and/or safety thresholds from regulations. Various embodiments provide methods that may help temperature to avoid these thresholds from being reached by more intelligently balancing processing loads that generate heat in devices such as the AR glasses 140.

The processors 284 may control a transmission power of the transceiver 282 (e.g., DL/UL power), a bandwidth parameter, or a data rate of the transceiver. The processors 284 may generate an alert when a threshold is about to be reached or has been reached. The processors 284 may periodically combine the temperature measurements from the sensors T1-T5 and other sensors to determine an operating state of the wearable (e.g., AR glasses 140). The scaling or power limiting may be based on the particular component temperature and may apply only to the particular component (e.g., component specific response). A common application programming interface (API) for the reporting of temperatures from the various components may be supported by the AR glasses 140 and executed on the processors 284.

As an example, upon the GPU 286 reaching a particular temperature (e.g., X deg from threshold), the processors 284 may instruct the GPUs 286 to reducing rendering load by reducing frame rate, reducing resolution, or skipping areas outside of the user's attention. As another example, upon the transceiver 282 reaching a particular temperature (e.g., X deg from threshold), the processors 284 may instruct the transceiver 282 to reduce a data rate (and correspondingly instruct the CPU and GPU to prepare for a data bottleneck) or increase compression (and correspondingly instruct the CPU or GPU to compress data further). Upon the IMU 290 reaching a particular temperature (e.g., X deg from threshold), the processors 284 may instruct the IMU 290 to reduce a sampling rate, reduce sensitivity, reduce output resolution, or suspend gyroscope sensing while keeping accelerometer sensing. The common API for temperature management on the AR glasses 140 may instruct one or more components to rely on historical data and predicted states rather than real-time measurement and calculation.

The AR glasses 140 may connect to edge server 115 via one or more hardware interfaces (e.g., ethernet, Wi-Fi) and via one or more software interfaces (e.g., API). One or more applications on the AR glasses may connect to the edge server 115 via the hardware or software interfaces. A processor overlay or hypervisor on the AR glasses may coordinate parallel processing or co-processing across the XR server 110, edge server 115, and AR glasses 140 by allocating threads or processes to one or more of the devices.

Figure 3A:
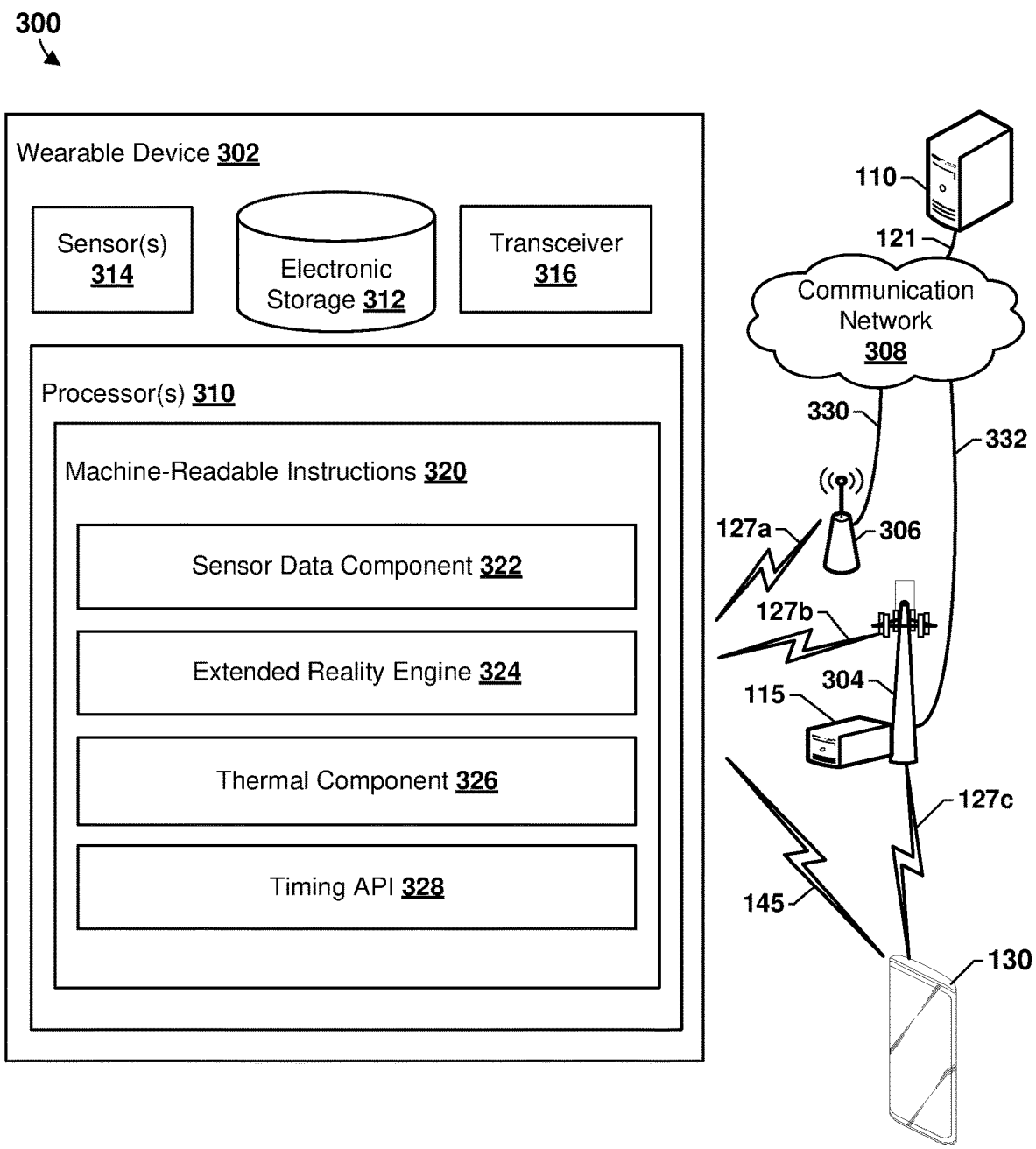
FIG. 3A is a system block diagram illustrating a component block diagram suitable to implement various aspects herein.
Figure 3B:
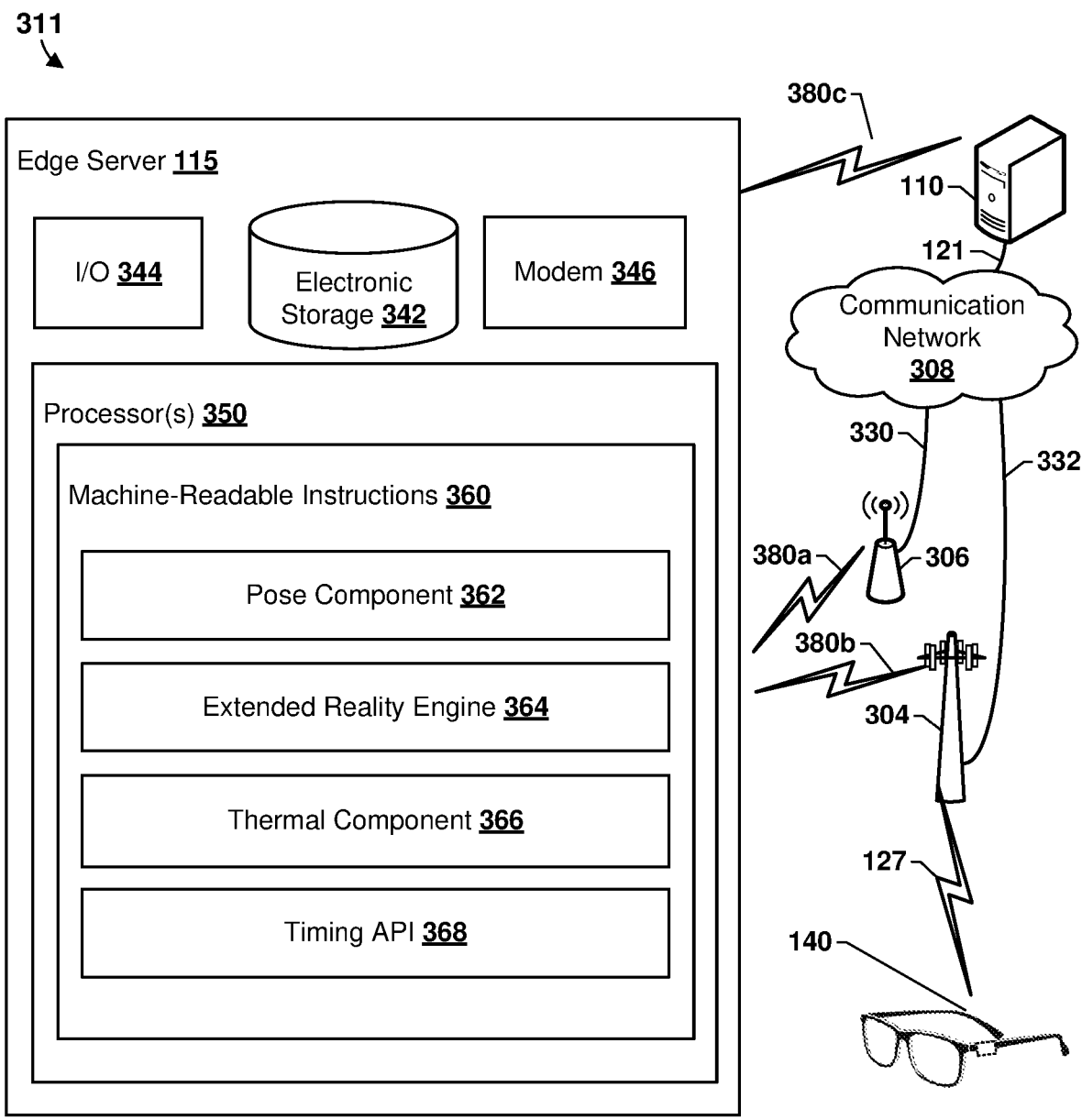
FIG. 3B is a system block diagram illustrating a component block diagram suitable to implement various aspects herein.

The edge server 115 may be a part of an edge node (e.g., 5G eNB, gNB, Wi-Fi AP) and may include one or more processors, memory, communication interfaces, and long-term storage as illustrated in FIG. 3B. The edge server 115 may be configured with software applications that execute on its processors including an orientation processing component 240, a graphics rendering component 250, and a prediction component 260. The orientation processing component 240 may receive pose information or orientation information from the AR glasses 140 or the IMU of a wearable (e.g., IMU 290). For example, the orientation processing component 240 may receive raw sensor data from accelerometers, gyroscopes, and gravitometers on the wearable and may process this sensor data into one or more of head tilt, gaze angle, motion identification (e.g., head shake), or other user actions. For example, the orientation processing component 240 may process a camera view to determine if the wearable is upside-down or not. The orientation processing component 240 may receive periodic updates from the sensors or from the wearable at a sampling rate that is different from or equal to the sampling (measurement) rate of the IMU 290.

The graphics rendering component 250 may include hardware and software components including a GPU and a cross-functional API to provide an agnostic way for third party applications to be executed in whole or in part on the graphics rendering component 250. The graphics rendering component 250 may perform ray-tracing, physics simulation, shading, and other computer graphics effects. For example, the AR glasses 140 may request a graphical icon to be shaded and provide one or more instructions and functions to be executed to generate the icon—called split-rendering. The icon maybe rendered on the graphics rendering component 250 and transmitted back to the AR glasses 140 for display. In the case of a shared application operating on the AR glasses 140 and the graphics rendering component 250, the application may coordinate execution of one or more instructions (or functions or processes) on the graphics rendering component 250 and on the GPU 286 of the AR glasses 140 and may coordinate the combination of the results of that execution at a display.

Overheating conditions in the AR glasses 140 may be reported to the edge server 115 or the XR server 110 to assist with coordinated action to reduce processing load (e.g., slow game play of an application for all users). For example, if the GPU of the wearable is overheating, the edge server 115 or the XR server 110 may take over user gesture calculation or graphics rendering (so long as there is available bandwidth to the wearable). The edge server 115 or the XR server 110 may be provided with comprehensive temperature information from the wearable including temperature data on a per-component level so that the edge server 115 or the XR server 110 can identify and take appropriate action (even if the wearable does not have one or more split-rendering capabilities).

The prediction component 260 may include one or more trained machine learning models or other predictive artificial intelligence applications that receive the current temperature values, processing allocation, and specifications of the components of one or more wearables and output one or more predicted temperatures or temperature alerts for one or more components at a future point in time. The predicted timing of the temperature may be set as a parameter. The prediction component 260 may provide the predicted temperatures to the wearable to assist the wearable's thermal management systems in allocating processor load.

Likewise, the XR server 110 may have software applications that execute on its processors including an orientation processing component 210, a graphics rendering component 220, and a prediction component 230. These components 210-230 may provide corresponding functions to the components 240-260 of the same name in the edge server 115. The edge server 115 may provide processing support and co-processing (e.g., split rendering) to many wearables and may additionally offload some of its processes or rendering to XR server 110. This offloading decision may be based on a comparison of round-trip transmission latency to the XR server 110 and local processor delay at the edge server 115. Other considerations for balancing between edge processing and external processing at the XR server 110 are contemplated (e.g., application security preferences).

In general, the system and processes of various embodiments involve coordination and information sharing across communication protocols (e.g., wireless protocols—Wi-Fi, 5G) and across devices. In various implementations, this coordination may be performed by a cross-layer application programmable interface (API) that may control or inform one or more layers of the 5G protocol on one or more devices and may control or inform one or more layers of the Wi-Fi protocol on one or more devices. In various implementations, coordination may be performed by a cross-layer API that may control or inform one or more processors on one or more devices (e.g., edge server 115) and may control or inform one or more processes (e.g., AR facial recognition) on one or more devices. For example, the cross-layer API may be configured to operate on the AR glasses 140, XR server 110, and edge server 115. In various implementations, the coordination may be performed via enhanced messaging throughout the architecture or performed by inserting additional information into resource requests and timing negotiations so as to inform devices in the architecture of the time constraints of other devices (e.g., a target wake time (TWT) window, pose generation, etc.). Accordingly, processing may be coordinated across devices in the architecture.

FIG. 3A is a component block diagram illustrating a system 300 configured to balance processing between an extended reality server (e.g., XR server 110), an edge server 115, and an AR device 130 (e.g., AR glasses) in accordance with various embodiments. With reference to FIGS. 1A-3A, the system 300 may include a wearable device 302 (e.g., AR glasses 140) configured to communicate with a bridge device 130 (e.g., a UE) or other computing devices via a local wireless connection (e.g., radio link 127, Wi-Fi 145, Bluetooth, Ant, etc.) or other near field communication (NFC) communication techniques. The bridge device 130 may be configured to relay communications between the wearable device 302 and a wireless communication network 308, such as a cellular wireless communication network, via a wireless communication link 127c with a gNB 304, which may connect via backhaul or midhaul 332 to communication network 308. The wearable device 302 may also be configured to communicate directly (i.e., without a bridge device) with external resources (e.g., XR server 110) via a wireless communication link 127a, 127b to the wireless communication network 308. Wireless connection 127a may be a radio link to a picocell 306, which may connect via backhaul or midhaul 330 to communication network 308. Wireless connection 127b may be a radio link to the gNB 304, which may connect via backhaul or midhaul 332 to communication network 308. The communication network 308 may connect to a XR server 110 via link 121 (e.g., fiber) and the edge server 115 may be co-located with gNB 304.

The wearable device 302 may include one or more processors 310, electronic storage 312, one or more sensor(s) 314, a transceiver 316 (e.g., wireless transceiver), and other components. The wearable device 302 may include communication lines, or ports to enable the exchange of information with a network and/or other computing platforms. Illustration of the wearable device 302 in FIG. 3A is not intended to be limiting. The wearable device 302 may include a plurality of hardware, software, and/or firmware components operating together to provide the functionality attributed herein to the wearable device 302.

Electronic storage 312 may include non-transitory storage media that electronically stores information. The electronic storage media of electronic storage 312 may include one or both of system storage that is provided integrally (i.e., substantially non-removable) with the wearable device 302 and/or removable storage that is removably connectable to the wearable device 302 via, for example, a port (e.g., a universal serial bus (USB) port, a firewire port, etc.) or a drive (e.g., a disk drive, etc.). Electronic storage 312 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 312 may include one or more virtual storage resources (e.g., cloud storage, a virtual private network, and/or other virtual storage resources). Electronic storage 312 may store software algorithms, information determined by processor(s) 310, information received from the wearable 302, information received from the edge server 115, external resources (e.g., XR server 110), and/or other information that enables the wearable device 302 to function as described herein.

The processor(s) 310 may include one of more local processors (as described with reference to FIGS. 7 and 8), which may be configured to provide information processing capabilities in the wearable device 302 (e.g., AR glasses 140). As such, processor(s) 310 may include one or more of a digital processor, an analog processor, a digital circuit designed to process information, an analog circuit designed to process information, a state machine, and/or other mechanisms for electronically processing information. Although processor(s) 310 is shown in FIG. 3A as a single entity, this is for illustrative purposes only. In some embodiments, processor(s) 310 may include a plurality of processing units. These processing units may be physically located within the same device, or processor(s) 310 may represent processing functionality of a plurality of devices operating in coordination.

Figure 7:
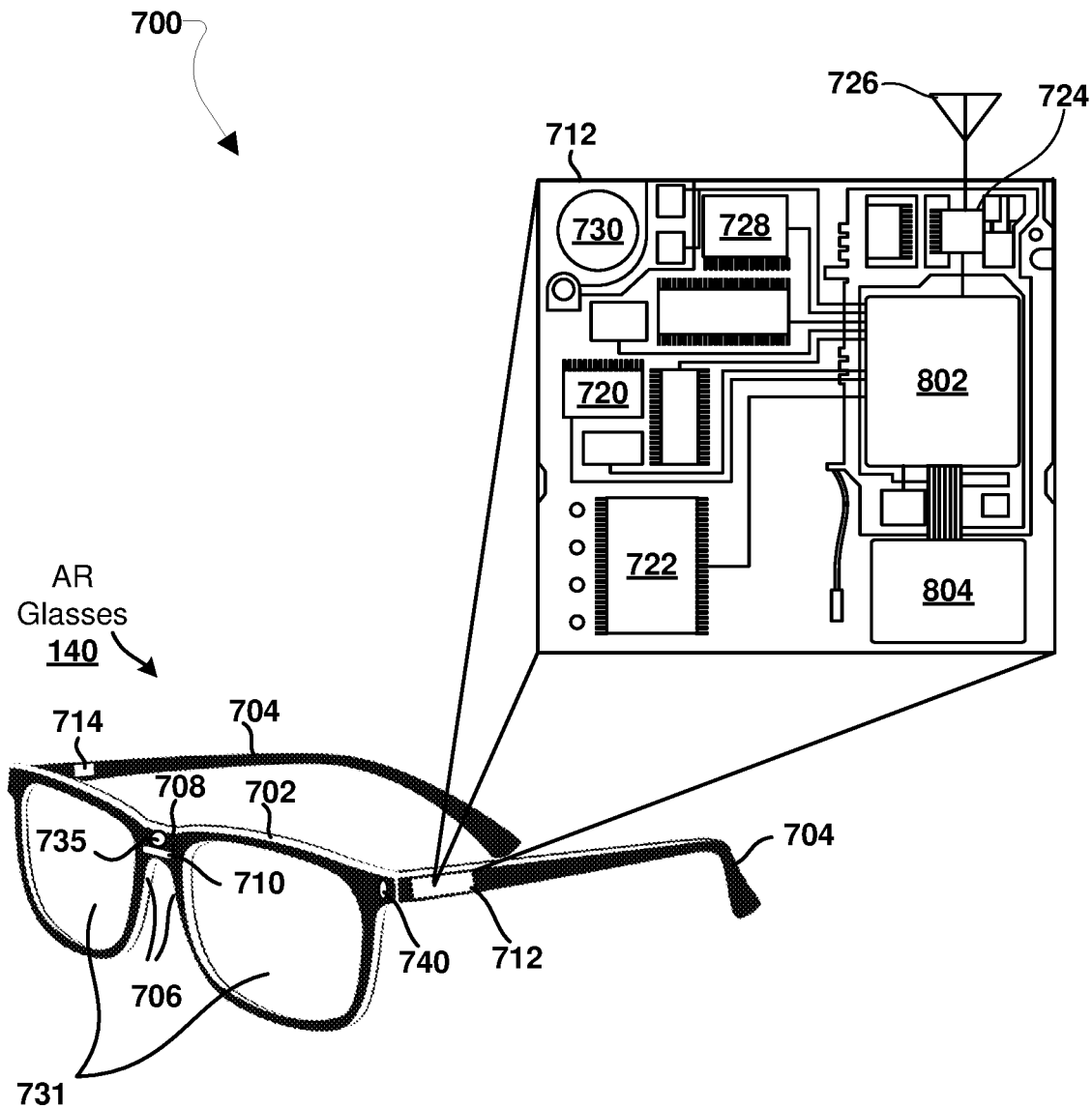
FIG. 7 is a component block diagram of an example of smart glasses suitable for use with various aspects herein.

The wearable device 302 may be configured by machine-readable instructions 320, which may include one or more instruction modules. The instruction modules may include computer program components. In particular, the instruction modules may include one or more of a sensor data component 322, an extended reality engine 324, a thermal component 326, a timing API 328, and/or other instruction modules. Together these components (e.g., 322-328) of wearable device 302 may provide an augmented reality experience via AR glasses 140 as also illustrated in FIG. 7.

The sensor data component 322 may connect to one or more sensors 314 to detect orientation, ranging, inertia, movement, direction, and other pose information. Ranging sensor information may come from one or more cameras, radio or sound ranging sensors, lasers, wireless signaling (e.g., Wi-Fi ranging), ultrasonic and/or other range finding systems. Imaging sensors using computer vision may detect the location and angular orientation of surfaces, as well as recognize objects. Inertial and orientation information may be detected by an inertial measurement unit (IMU) including accelerometers, gravitometers, and magnetometers. Direction, orientation, and movement may be detected by global positioning system (GPS) receivers or the like. Other pose information and eye tracking data may be captured by a camera and inferred or calculated from the camera data via one or more computer models.

As a non-limiting example, the processor(s) 310 of the wearable device 302 may receive sensor data directly from onboard sensors, such as the sensor(s) 314, and/or use one or more transceivers (e.g., 724) for detecting available wireless connections (e.g., Wi-Fi, Bluetooth, cellular, etc.) and for obtaining sensor information from remote sensors. Also, the sensor data component 322 may be configured to determine whether a detected communication link is available to a bridge device 130 or other remote computing device (e.g., by measuring signal strength).

The extended reality (XR) engine 324 may include one or more audiovisual rendering processes to render graphics and sounds for the XR/AR experience provided by the device. The XR engine 324 may, for example, render icons indicating further information is available corresponding to real-world objects being viewed by a user via AR glasses 140. The XR engine 324 may, for example, generate and play an animal sound corresponding to an animal being viewed in a zoo through AR glasses 140.

As a non-limiting example, the processor(s) 310 of the wearable device 302 may render AR/XR audiovisual information on the processors, and/or use one or more transceivers (e.g., 724) to manage and obtain rendered audiovisual data for provision to the user from a remote computing resource (e.g., XR server 110) based on local information (e.g., pose). The XR engine 324 may include an extended reality application and may initialize contact with XR server 110 and operate one or more processes of the XR engine 324 remotely on the XR server 110 or edge server 115.

The thermal component 326 may receive temperature measurements from one or more temperature sensors (e.g., T1-T5) of sensors 314 that are located on or adjacent to one or more hardware components of the wearable device 302 (e.g., 290, 724, 728, 730, 802, 804). The thermal component 326 may process temperature measurements from sensors T1-T5 to determine time trends and statistics. The thermal component 326 may correlate temperature measurements from sensors T1-T5 with processing loads at respective hardware components or data throughput at transceiver 316. The thermal component 326 may correlate temperature measurements from sensors T1-T5 with various graphical elements, rendering processes, instructions from the edge server 115, or other applications. The thermal component 326 may predict one or more temperatures based on a machine learning model therein that maps a first processor load at one component to a second processor load at another component. The thermal component 326 may contain one or more temperature thresholds for the device and one or more components.

As a non-limiting example, the processor(s) 310 of the wearable device 302 may calculate thermal conditions of the wearable device 302 and compare the conditions to safety thresholds in order appropriately to allocation processing to a remote computing resource (e.g., XR server 110) or another external network device. The transceiver 316 of the wearable device 302 may transmit one or more thermal measurements or thermal thresholds to the edge server 115 or XR server 110 for analysis. The edge server 115 or XR server 110 may adjust processing loads based on this thermal information.

The timing API 328 of wearable device 302 (e.g., AR glasses 140) may form a connection with a corresponding API at a bridge device 130 or edge server 115 and may exchange messages including timing information with the corresponding API. The timing API 328 may negotiate or request network resources from a Wi-Fi network or radio network (e.g., 5G) via control messages. The timing API 328 may receive data timing information from the extended reality engine 324 or pose timing information from the sensor data component 322 and may coordinate changes to network resources based on the received timing information.

As a non-limiting example, the processor(s) 310 of the computing device 302 may execute the timing API 328 on the processors, and/or use one or more transceivers (e.g., 724) to connect corresponding APIs of an edge server 115 or other external network devices. The processor(s) 310 of the computing device 302 may execute the timing API 328 to provide an available interface for coordination with one or more external devices.

FIG. 3B is a component block diagram illustrating a system 311 configured to coordinate and translate transmissions between an edge server 115 and a communication network in accordance with various embodiments. With reference to FIGS. 1A-3B, the system 311 may include an edge server 115 configured to communicate with one or more AR glasses 140 or other computing devices via a local wireless connection (e.g., radio link 380a/b, Wi-Fi, Bluetooth, Ant, etc.) or other NFC communication techniques. The edge server 115 may also be configured to communicate with external resources (e.g., XR server 110) via a wireless connection 380a/b to a wireless communication network 308, such as a cellular wireless communication network. The wireless connection 380a may be a radio link to picocell 306 which may connect via backhaul or midhaul 330 to communication network 308. The wireless connection 380b may be a radio link to a gNB 304, which may connect via backhaul or midhaul 332 to communication network 308. The communication network 308 may connect to an XR server 110 via link 121 (e.g., fiber). The edge server 115 may connect directly to the XR server 110 via wireless connection 380c or via a backhaul, midhaul, or fronthaul link.

The edge server 115 may include one or more processors 350, electronic storage 342, one or more input/output (I/O) interfaces 344, a modem 346 (e.g., wireless transceiver or fiber modem), and other components. The edge server 115 may include communication lines, or ports to enable the exchange of information with a network and/or other computing platforms. Illustration of the edge server 115 in FIG. 3B is not intended to be limiting. The edge server 115 may include a plurality of hardware, software, and/or firmware components operating together to provide the functionality attributed herein to the edge server 115.

Electronic storage 342 may include non-transitory storage media that electronically stores information. The electronic storage media of electronic storage 342 may include one or both of system storage that is provided integrally (i.e., substantially non-removable) with the edge server 115 and/ or removable storage that is removably connectable to the edge server 115 via, for example, a port (e.g., a universal serial bus (USB) port, a firewire port, etc.) or a drive (e.g., a disk drive, etc.). Electronic storage 342 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 342 may include one or more virtual storage resources (e.g., cloud storage, a virtual private network, and/or other virtual storage resources). Electronic storage 342 may store software algorithms, information determined by processor(s) 350, information received from the edge server 115, information received from AR glasses 140, external resources (e.g., XR server 110), and/or other information that enables the edge server 115 to function as described herein.

The processor(s) 350 may include one of more local processors (as described with reference to FIGS. 7 and 8), which may be configured to provide information processing capabilities in the edge server 115. As such, the processor(s) 350 may include one or more of a digital processor, an analog processor, a digital circuit designed to process information, an analog circuit designed to process information, a state machine, and/or other mechanisms for electronically processing information. Although the processor 350 is shown in FIG. 3B as a single entity, this is for illustrative purposes only. In some embodiments, the processor(s) 350 may include a plurality of processing units. These processing units may be physically located within the same device, or the processor(s) 350 may represent processing functionality of a plurality of devices operating in coordination.

The edge server 115 may be configured by machine-readable instructions 360, which may include one or more instruction modules that are stored non-transitory memory, such as storage 342. The instruction modules may include computer program components. In particular, the instruction modules may include one or more of a pose component 362, an extended reality engine 364, a thermal component 366, a timing API 368, and/or other instruction components. Together these components (e.g., 362-368) of edge server 115 may provide processing resources and load balancing intelligence for an augmented reality device.

The pose component 362 may connect to one or more sensors 314 of wearable device 302 including global positioning system (GPS) components, IMUs (e.g., IMU 290), time of flight (TOF) or round-trip time (RRT) sensors, and other sensors. The pose component 362 may include processes for data collection from sensors 314 and may store this data on electronic storage 342.

As a non-limiting example, the processor(s) 350 of the edge server 115 may operate the pose component 362 on the processors, and/or use one or more modems (e.g., modem 346) to connect to remote sensors or other external network devices. The processor(s) 350 of the edge server 115 may execute the pose component 362 to obtain timing, location, orientation, and quality of service measurements for an AR device.

The extended reality (XR) engine 364 may include one or more audiovisual rendering processes to render graphics and sounds for the XR/AR experience provided by the wearable 302. The XR engine 364 may, for example, render icons indicating further information is available corresponding to real-world objects being viewed by a user via AR glasses 140. The XR engine 364 may, for example, generate and play an animal sound corresponding to an animal being viewed in a zoo through AR glasses 140.

As a non-limiting example, the processor(s) 350 of the edge server 115 may render AR/XR audiovisual information on the processor(s), and/or use one or more modems 346 or links 380*a-c* to manage and obtain rendered audiovisual data for provision to the user device based on local information (e.g., pose). The XR engine 364 may include an extended reality application and may initialize contact with XR server 110 and operate one or more processes of the XR engine 364 (or XR engine 324) remotely on the XR server 110 or AR glasses 140.

The thermal component 366 may receive temperature measurements from one or more temperature sensors (e.g., T1-T5) of sensors 314 that are located on or adjacent to one or more hardware components of the wearable device 302 (e.g., 290, 724, 728, 730, 802, 804). The thermal component 366 may process temperature measurements from sensors T1-T5 to determine time trends and statistics. The thermal component 366 may correlate temperature measurements from sensors T1-T5 with processing loads at respective hardware components or data throughput at transceiver 316. The thermal component 366 may correlate temperature measurements from sensors T1-T5 with various graphical elements, rendering processes, instructions from the AR glasses 140, instructions from XR server 110, or other applications.

Figure 6:
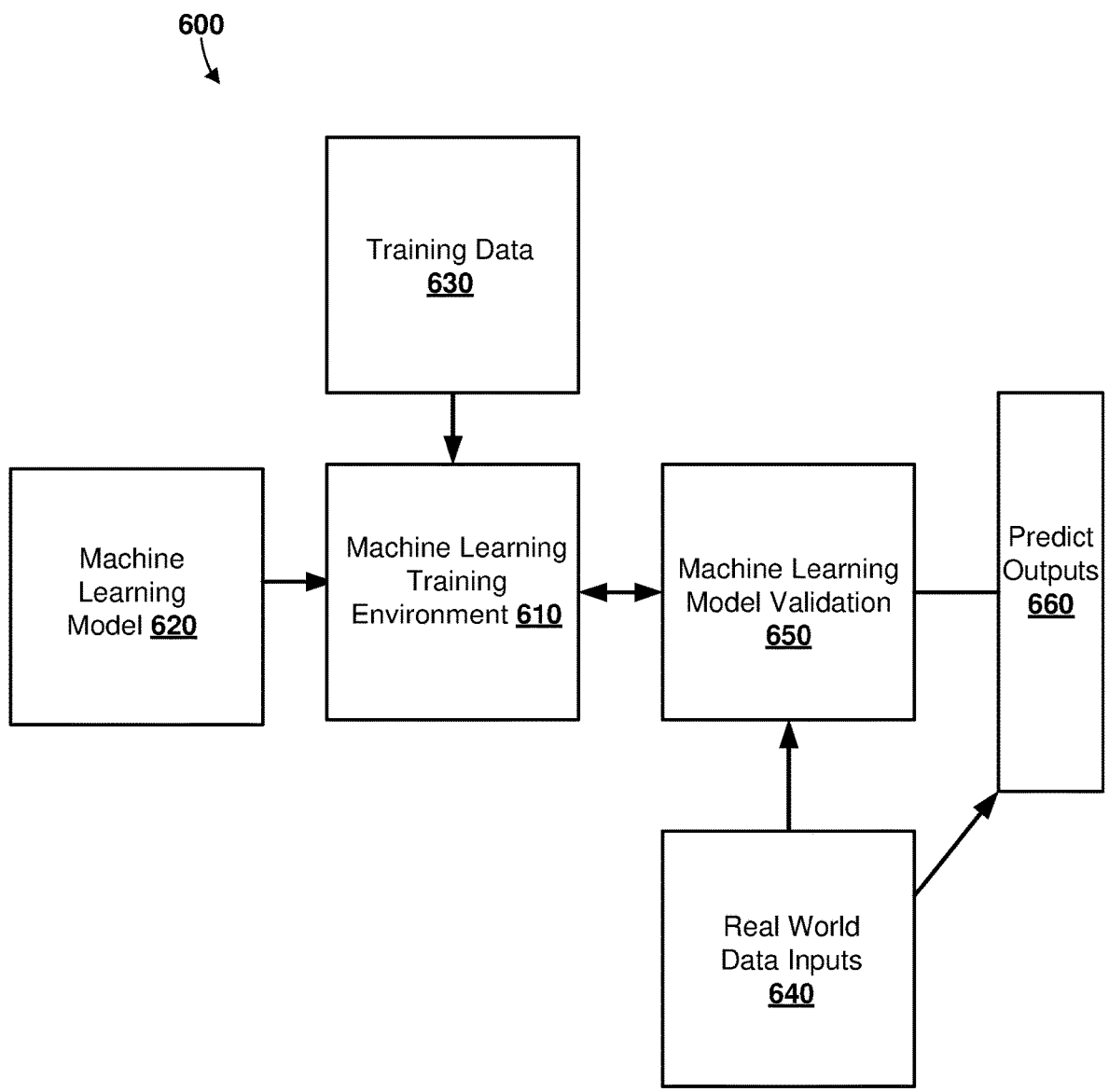
FIG. 6 is a block diagram illustrating a machine learning process suitable for implementing various aspects herein.

The thermal component 366 may predict one or more temperatures within and AR device (e.g., AR glasses) based on a machine learning model that maps a first processor load at one component within the AR device 302 to a second processor load in another component of the AR device. The machine learning model of thermal component 366 may be trained as illustrated in FIG. 6. The thermal component 366 may store one or more temperature thresholds for the wearable device 302 and one or more of its components. Based on these predicted temperatures or thresholds, the thermal component 366 may generate one or more instructions to control load balancing or processing loads at the XR engine 364 or the XR engine 324. Based on these predicted temperatures or thresholds, the thermal component 366 may generate one or more instructions to control load balancing or processing loads of one or more of the components of the wearable device 302 (e.g., processors 310, sensors 314, or transceiver 316).

As a non-limiting example, the processor(s) 350 of the edge server 115 may calculate thermal conditions of the wearable device 302 and compare the conditions to safety thresholds in order appropriately to allocation processing to a remote computing resource (e.g., XR server 110) or its own XR engine 364. The modem 346 of the edge server 115 may transmit one or more thermal measurements or thermal thresholds to the XR server 110 for analysis. The edge server 115 or XR server 110 may adjust processing loads based on this thermal information.

The timing API 368 of the edge server 115 may form a connection with a corresponding API at an AR device (e.g., timing API 328) or network device and may exchange messages including data timing information with a corresponding API. The timing API 368 may negotiate or request network resources from a Wi-Fi network or radio network (e.g., 5G) via control messages. The timing API 368 may receive data timing information from the XR engine 324/364 or pose timing information from the pose component 362 and may coordinate changes to network resources based on the received timing information.

As a non-limiting example, the processor(s) 350 of the edge server 115 may execute the timing API 368 on the processors, and/or use one or more modems 346 to connect corresponding APIs of an AR device or other external network devices. The processor(s) 350 of the edge server 115 may execute the timing API 368 to provide an available interface for coordination with one or more external devices, one or more Wi-Fi resource controllers, and one or more radio resource controllers.

Figure 4A:
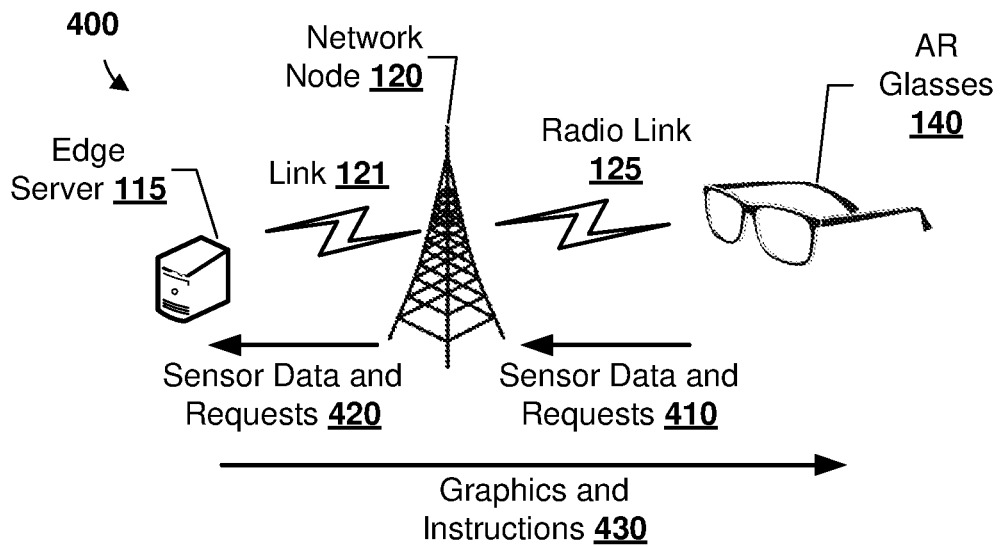
FIG. 4A is a system block diagram illustrating a flow of wireless communications suitable to implement various aspects herein.

FIG. 4A illustrates a system diagram of data flows 400 according to an implementation involving a split rendering scenario. With reference to FIGS. 1A-4A the AR glasses 140 or other wearable may connect to a network node 121 via one or more wireless protocols and the network node 120 may connect to an edge server 115. The AR glasses 140 may periodically transmit temperature sensor data, pose information, and processing requests (collectively sensor data and requests 410) to the network node 120, which may direct these messages to the edge server 115 as sensor data and requests 420 or to an XR server 110.

The edge server 115 may use the pose information to generate the requested graphics as a part of the split-rendering. The edge server 115 may process the temperature sensor data and generate one or more instructions to control the balance of the split rendering between server and user device or to control performance and quality at the user device (e.g., reduce resolution at the user device). The one or more instructions to the user device may be based on one or more predicted temperatures from the prediction component 260 of the edge server 115. An example flow of data is illustrated in more detail in FIG. 4B.

Figure 4B:
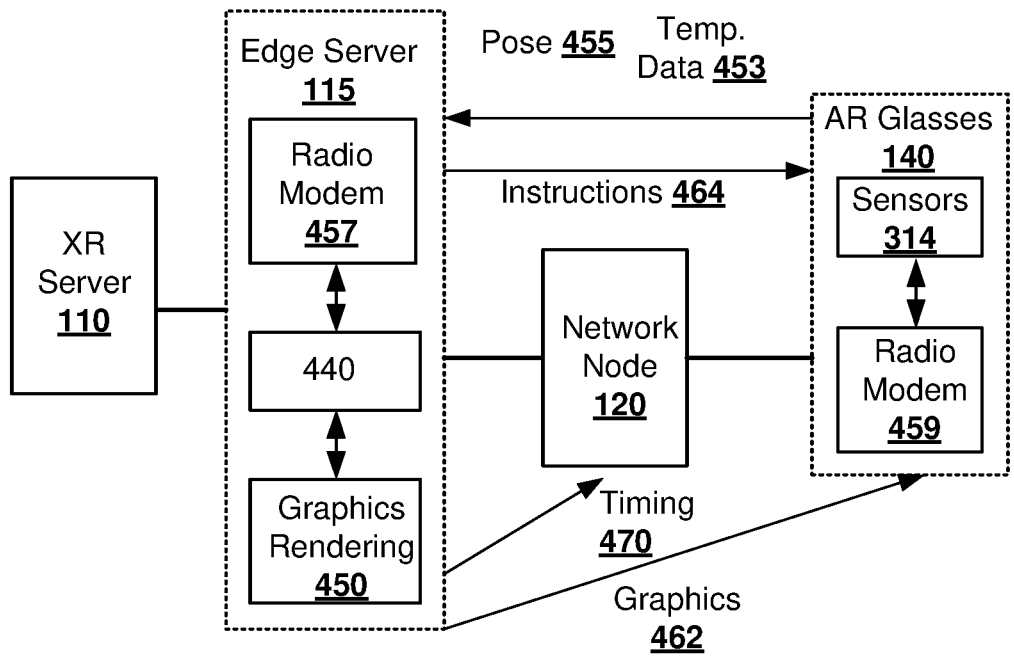
FIG. 4B is a system block diagram illustrating a flow of wireless communications suitable to implement various aspects herein.

FIG. 4B is a block diagram of data flows for a split-rendering architecture according to some embodiments. With reference to FIGS. 1A-4B, the AR glasses 140 may include sensors 314 including temperature sensors and orientation sensors and may include a radio modem 459 to connect to a wireless network. The AR glasses may connect to edge server 110 via network node 120. The AR glasses 140 may transmit pose information 455 and temperature data 453 via the radio modem 459. The pose information 455 and temperature data 453 may be sourced from sensors 314. An API 440 or shared application on edge server 115 may process the pose information according to pre-stored instructions (e.g., a part of the shared application) or according to instructions transmitted with the pose information (e.g., sensor data and requests 410).

Based on the processing of the pose information 455, the edge server 115 may generate graphics 462, via graphics rendering 450, for display on the AR glasses 140. The edge server 115 may transmit the graphics 462 back to the AR glasses 140 via the network node 120. The edge server 115 may coordinate with the XR server 110 to perform graphics rendering as well. Based on the temperature data 453, the edge server 115 may modify one or more instructions or processes of API 440 and may generate instructions to modify processes or parameters at the AR glasses 140. These instructions 464 may be transmitted to the AR glasses 140 to re-balance processing loads between the AR glasses and the edge server based on sensed temperatures or predicted temperatures at the component level of the AR glasses 140.

In FIG. 4B the edge server 115 is illustrated as issuing the instructions 464 to re-balance processing loads and the AR glasses 140 may make similar adjustments via instructions to the edge server 115. For example, AR glasses 140 may already be providing requests for processing at the edge server 115 as noted in FIG. 4A and may modify these requests or rescind these requests based on analysis at the AR glasses 140. The edge server 115 may inform the network node 120 of an expected timing 470 for graphics to be sent to the AR glasses 140. This may cause the network node to reserve network resources for the future transmission. The edge server 115 may inform the AR glasses 140 of the expected timing of the graphics transmission and the AR glasses 140 may then request network resources via radio resource control (RRC) message or via control messages in a WLAN or Wi-Fi network (e.g., appended to block ack frame or other management frame). This coordination of timing and rendering allocation may be accomplished via RRC messages between the AR glasses 140 and the network or via an application layer of the network (e.g., API 440). The timing and resource control, including network bandwidth resource allocation based on temperature or predicted temperature may improve latency in the split architecture.

Figure 5:
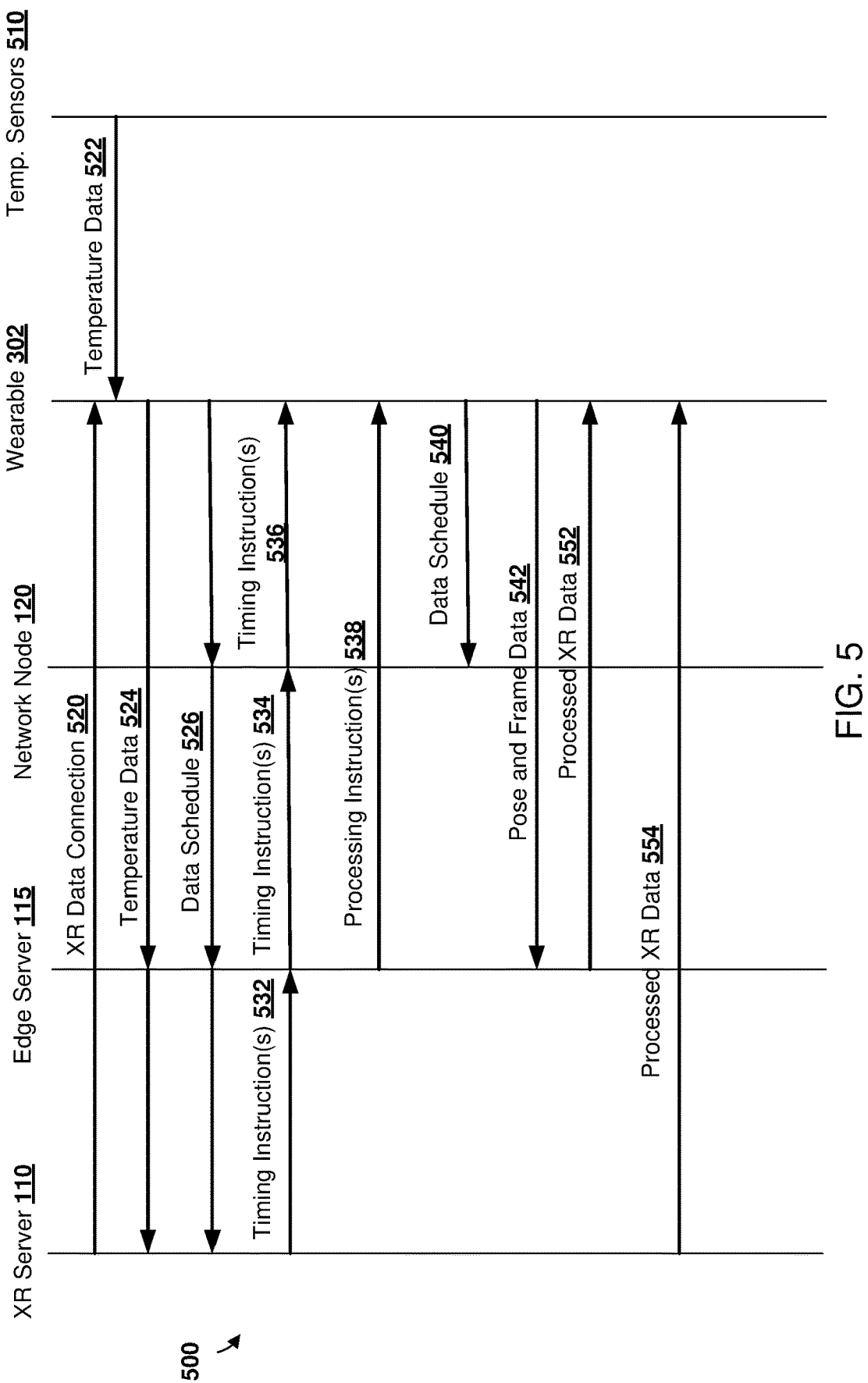
FIG. 5 is a flow diagram illustrating a flow of wireless communications suitable to implement various aspects herein.

FIG. 5 is a process flow diagram illustrating an example process 500 for adjusting processing loads between an edge server 115 and AR glasses 140. With reference to FIGS. 1A-5, the process 500 provides a portion of information flows that begin with the data stream from the XR server 110 (or edge server 115) supplying XR data to the wearable device 302 via XR data connection 520. The temperature sensors 510 (of sensors 314) may transmit temperature data 522 internally from each of the components of the AR glasses to a memory or processor thereof. The AR glasses 140 may provide temperature data 522 from sensors at each component and may provide temperature history as temperature data 524 to the edge server 115 and XR server 110. The AR glasses 140 may inform the edge server or the XR server 110 of a data schedule 526 that provides timing requirements for certain graphics that need to be rendered.

The XR server 110 and the edge server 115 may coordinate how to split the allocated rendering between them and XR server 110 may transmit timing instruction 532 to edge server 115. The timing instruction 532 may include deadlines for data needed by XR server 110 from edge server 115 to complete rendering (e.g., processed pose determination). The timing instruction 532 may include expected rendering completion times for graphics allocated to the XR server. Likewise, edge server 115 may provide the network node 120 with timing instructions 534 which may include bandwidth resource requests as described with reference to FIG. 4B. The network node 120 may forward one or more timing instructions 536 from the XR server 110 and edge server 115 to the wearable 302. The timing instructions 536 may inform the wearable device 302 of when to expect rendered data for display (e.g., in response to requests in the data schedule 526). The edge server 115 may adjust the data schedule 526 based on the temperature data 524 from one or more components of the wearable to adjust processing load at the wearable 302. That is, the timing instructions 536 may not match the requested data schedule 526.

The edge server 115 may provide one or more processing instructions 538 to the wearable device 302 based on resource availability, temperature data 524, or predicted temperatures based on the temperature data. The processing instructions 538 may adjust one or more parameters of processing at one or more of the components of the wearable device 302 (e.g., rendering frame rate, acceleration sampling rate, processor power). Based on the processing instructions 538 and the timing instructions 536 adjusting one or more aspects of the split rendering resource allocation, the wearable device 302 may inform the network node 120 of changes in bandwidth needs in an updated data schedule 540. The wearable device 302 may then receive XR data that has been rendered in accordance with the updated schedule or wearable device 302 may provide to the edge server 115 pose and frame data 542 that is adjusted or configured based on the processing instructions 538. In response and based on the prior processing instructions balancing the load, the edge server 115 may transmit processed XR data 552 (e.g., rendered graphics). Further processed XR data 554 may be transmitted from the XR server 110. The illustrated processes 532-552 may be repeated to adjust the processing allocation whenever the edge server 115 receives updated temperature information or predicts temperature changes based on the processing allocation.

FIG. 6 is a process flow diagram illustrating an example process flow 600 for training a machine learning model to predict temperatures at various components. With reference to FIGS. 1A-6, the process 600 may be performed by a server, such as the edge server 115, to train the prediction components 230/260. The machine learning environment 610 may be executed on processors 350 of the edge server 115 to train a machine learning model of the prediction component 260 on new devices and components that connect to the edge server 115 for XR graphic support. The machine learning model may take as predictors not only the expected processing load at one or more components, but also the device and component specifications and parameters.

For example, a machine learning algorithm (e.g., software code) or model 620 is provided that maps data inputs (e.g., processor load and device data) to predicted outputs (e.g., temperature). In the machine learning environment 610, the machine learning algorithm 620 may be trained using training data 630 (e.g., a portion of the temperature data 524). For example, the training data 630 may be a representational set of data for self-supervised training by the machine learning model 620, or could have been pre-classified by humans, or a combination of both. After the machine learning model 620 has been trained using the training data 630, the machine learning model 630 may be tested, with real world data inputs 640 to determine an accuracy of the machine learning relative to the real-world results. For example, in the case of a neural network the accuracy of the mapping between inputs and outputs may be determined using the real-world inputs 640.

If an accuracy of the machine learning does not satisfy a desired accuracy (e.g., 95%, 98%, 99% accurate) under testing by the real-world inputs 640 in the machine learning validation 650, the machine learning code may be tuned or the training data 630 may be tuned. The tuning may include adding one or more predictor inputs (e.g., device information). The training in the training environment 610 may be repeated to achieve the desired accuracy. In this way, training in machine learning environment 610 and machine learning model validation 650 may be repeated until the machine learning model 620 is able to classify the real-world data inputs 640 with the desired accuracy.

After determining, with machine learning model validation 650, that an accuracy of the machine learning model 620 satisfies the desired accuracy, the process 600 the machine learning model may be used to predict outputs 660 in a prediction component 324. The process 800 may be used to train each of multiple machine learning algorithms (e.g., classifiers) described herein, and may be trained on separate data sets or trained to predict different outputs. That is, a machine learning model for prediction component 260 may be trained differently and configured differently than prediction component 230 (e.g., different training data, different inputs, different outputs).

Various embodiments (including embodiments discussed above with reference to FIGS. 1A-6) may be implemented on a variety of wearable devices, an example of which is illustrated in FIG. 7 in the form of AR glasses 140. With reference to FIGS. 1A-7, the AR glasses 140 may operate like conventional eyeglasses, but with enhanced computer features and sensors, like a built-in camera 735 and heads-up display or AR features on or near the lenses 731. Like any glasses, smart glasses may include a frame 702 coupled to temples 704 that fit alongside the head and behind the ears of a wearer. The frame 702 holds the lenses 731 in place before the wearer's eyes when nose pads 706 on the bridge 708 rest on the wearer's nose.

In some embodiments, AR glasses 140 may include an image rendering device 714 (e.g., an image projector), which may be embedded in one or both temples 704 of the frame 702 and configured to project images onto the optical lenses 731. In some embodiments, the image rendering device 714 may include a light-emitting diode (LED) module, a light tunnel, a homogenizing lens, an optical display, a fold mirror, or other components well known projectors or head-mounted displays. In some embodiments (e.g., those in which the image rendering device 714 is not included or used), the optical lenses 731 may be, or may include, see-through or partially see-through electronic displays. In some embodiments, the optical lenses 731 include image-producing elements, such as see-through Organic Light-Emitting Diode (OLED) display elements or liquid crystal on silicon (LCOS) display elements. In some embodiments, the optical lenses 731 may include independent left-eye and right-eye display elements. In some embodiments, the optical lenses 731 may include or operate as a light guide for delivering light from the display elements to the eyes of a wearer.

The AR glasses 140 may include a number of external sensors that may be configured to obtain information about wearer actions and external conditions that may be useful for sensing images, sounds, muscle motions and other phenomenon that may be useful for detecting when the wearer is interacting with a virtual user interface as described. In some embodiments, AR glasses 140 may include a camera 735 configured to image objects in front of the wearer in still images or a video stream, which may be transmitted to another computing device (e.g., edge server 115 or XR server 110) for analysis. Additionally, the AR glasses 140 may include a ranging sensor 740. In some embodiments, the AR glasses 140 may include a microphone 710 positioned and configured to record sounds in the vicinity of the wearer. In some embodiments, multiple microphones may be positioned in different locations on the frame 702, such as on a distal end of the temples 704 near the jaw, to record sounds made when a user taps a selecting object on a hand, and the like. In some embodiments, AR glasses 140 may include pressure sensors, such on the nose pads 706, configured to sense facial movements for calibrating distance measurements. In some embodiments, AR glasses 140 may include other sensors (e.g., a thermometer, heart rate monitor, body temperature sensor, pulse oximeter, etc.) for collecting information pertaining to environment and/or user conditions that may be useful for recognizing an interaction by a user with a virtual user interface. These sensors (e.g., sensors 314, ranging sensors 740) or an IMU (e.g., IMU 290) may provide measurements to sensor data component 322 in order to generate or compile pose information for the user. The pose information may then be uploaded to the XR server 110 or the edge server 115 for use in rendering graphics in the XR engine 364.

The processing system 712 may include processing and communication SOCs 802, 804 which may include one or more processors, one or more of which may be configured with processor-executable instructions to perform operations of various embodiments. The processing and communications SOC 802, 804 may be coupled to internal sensors 720, internal memory 722, and communication circuitry 724 coupled one or more antenna 726 for establishing a wireless data link with an external computing device (e.g., edge server 115), such as via a Bluetooth or Wi-Fi link. The processing and communication SOCs 802, 804 may also be coupled to sensor interface circuitry 728 configured to control and received data from a camera 735, microphone(s) 710, and other sensors positioned on the frame 702.

The internal sensors 720 may include an IMU that includes electronic gyroscopes, accelerometers, and a magnetic compass configured to measure movements and orientation of the wearer's head. The internal sensors 720 may further include a magnetometer, an altimeter, an odometer, and an atmospheric pressure sensor, as well as other sensors useful for determining the orientation and motions of the AR glasses 140. Such sensors may be useful in various embodiments for detecting head motions (e.g., pose changes) that may be used to adjust distance measurements as described. The processing system 712 may further include a power source such as a rechargeable battery 730 coupled to the SOCs 802, 804 as well as the external sensors on the frame 702.

Figure 8:
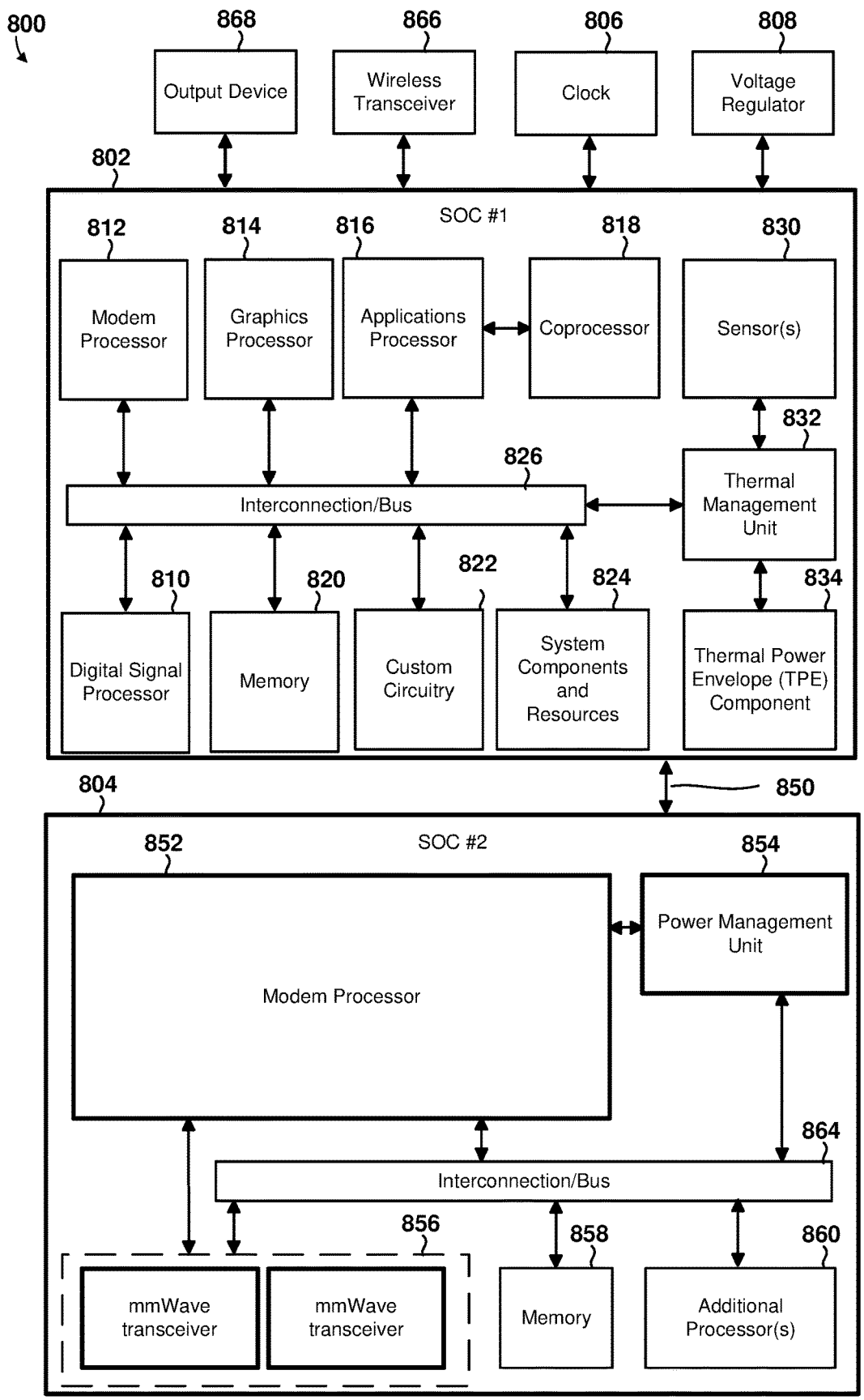
FIG. 8 is a component block diagram of connected processors suitable for implementing various aspects herein.

FIG. 8 is a component block diagram illustrating an example computing and wireless modem system 800 suitable for implementing any of the various embodiments. Various embodiments may be implemented on a number of single processor and multiprocessor computer systems, including a system-on-chip (SOC) or system in a package (SIP).

With reference to FIGS. 1A-8, the illustrated example computing system 700 includes a two SOCs 802, 804 (which may be a SIP in some embodiments) coupled to a clock 806, a voltage regulator 808, and a wireless transceiver 866 configured to send and receive wireless communications via an antenna (not shown) to/from a bridge device (e.g., 130) or a network device (e.g., 110, 115). In some implementations, the first SOC 802 may operate as central processing unit (CPU) of an AR device (e.g., AR glasses 140) that carries out the instructions of software application programs by performing the arithmetic, logical, control and input/output (I/O) operations specified by the instructions. In some implementations, the second SOC 804 may operate as a specialized processing unit. For example, the second SOC 804 may operate as a specialized 5G processing unit responsible for managing high volume, high speed (such as 5 Gbps, etc.), and/or very high frequency short wavelength (such as 28 GHz mmWave spectrum, etc.) communications.

The first SOC 802 may include a digital signal processor (DSP) 810, a modem processor 812, a graphics processor 814, an application processor 816, one or more coprocessors 818 (such as vector co-processor) connected to one or more of the processors, memory 820, custom circuitry 822, system components and resources 824, an interconnection/bus module 826, one or more temperature sensors 830, a thermal management unit 832, and a thermal power envelope (TPE)

component 834. The thermal management unit 832 and the thermal power envelope (TPE) component 834 may communicate with the edge server 115 or thermal component 326 of a wearable device 302 containing computing system 800. The second SOC 804 may include a 5G modem processor 852, a power management unit 854, an interconnection/bus module 864, a plurality of mmWave transceivers 856, memory 858, and various additional processors 860, such as an applications processor, packet processor, etc.

Each processor 810, 812, 814, 816, 818, 852, 860 may include one or more cores and one or more temperature sensors, and each processor/core may perform operations independent of the other processors/cores. For example, the first SOC 802 may include a processor that executes a first type of operating system (such as FreeBSD, LINUX, OS X, etc.) and a processor that executes a second type of operating system (such as MICROSOFT WINDOWS 10). In addition, any or all of the processors 810, 812, 814, 816, 818, 852, 860 may be included as part of a processor cluster architecture (such as a synchronous processor cluster architecture, an asynchronous or heterogeneous processor cluster architecture, etc.).

The first and second SOC 802, 804 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 824 of the first SOC 802 may include power amplifiers, voltage regulators, oscillators, phase-locked loops, peripheral bridges, data controllers, memory controllers, system controllers, access ports, timers, and other similar components used to support the processors and software clients running on an AR device. The system components and resources 824 and/or custom circuitry 822 also may include circuitry to interface with peripheral devices, such as cameras, electronic displays, wireless communication devices, external memory chips, etc.

The first and second SOC 802, 804 may communicate via interconnection/bus module 850. The various processors 810, 812, 814, 816, 818, may be interconnected to one or more memory elements 820, system components and resources 824, and custom circuitry 822, and a thermal management unit 832 via an interconnection/bus module 826. Similarly, the processor 852 may be interconnected to the power management unit 854, the mmWave transceivers 856, memory 858, and various additional processors 860 via the interconnection/bus module 864. The interconnection/bus module 826, 850, 864 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 802, 804 may further include an input/output module (not illustrated) for communicating with resources external to the SOC, such as a clock 806 and a voltage regulator 808. Resources external to the SOC (such as clock 806, voltage regulator 808) may be shared by two or more of the internal SOC processors/cores.

In addition to the example SIP 800 discussed above, some implementations may be implemented in a wide variety of computing systems, which may include a single processor, multiple processors, multicore processors, or any combination thereof.

Figure 9:
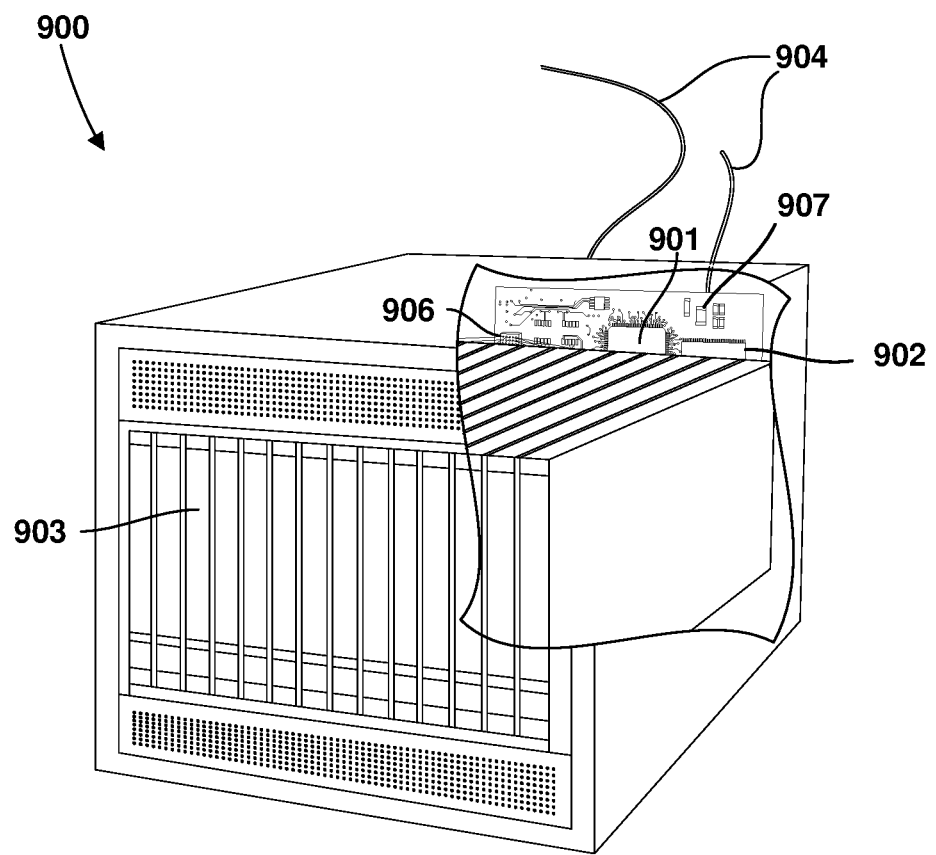
FIG. 9 is a component block diagram of a network device suitable for use with various aspects herein.

Various embodiments (including, but not limited to, embodiments discussed above with reference to FIGS. 1A-8) may be implemented on a variety of computing devices, an example of which is illustrated in FIG. 9 in the form of a server. With reference to FIGS. 1A-9, the network computing device 900 (e.g., XR server 110, edge server 115) may include a processor 901 coupled to volatile memory 902 and a large capacity nonvolatile memory, such as a disk drive 903. The network computing device 900 may also include a peripheral memory access device such as a floppy disc drive, compact disc (CD) or digital video disc (DVD) drive 906 coupled to the processor 901. The network computing device 900 may also include network access ports 904 (or interfaces) coupled to the processor 901 for establishing data connections with a network, such as the Internet and/or a local area network coupled to other system computers and servers. The network computing device 900 may include one or more transceivers 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

The processors of the AR glasses 140 and the network device 900 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 804 dedicated to wireless communication functions and one processor within an SOC 802 dedicated to running other applications. Software applications may be stored in the memory 342, 312 before they are accessed and loaded into the processor. The processors may include internal memory sufficient to store the application software instructions.

Figure 10:
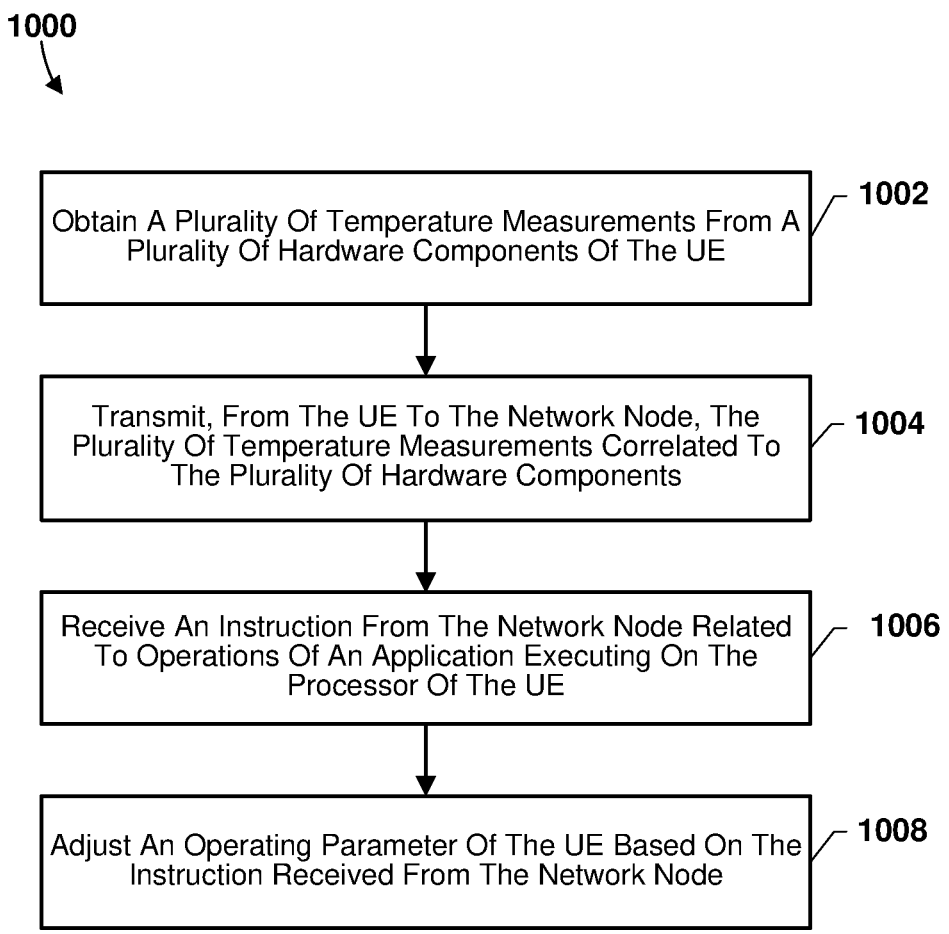
FIG. 10 is a process flow diagram illustrating an example process suitable for implementing various aspects herein.

FIG. 10 is a process flow diagram illustrating an example method 1000 for balancing resources. With reference to FIGS. 1A-10, the operations of the method 1000 are described with reference to a wearable device and processors within such a device. However, the use of the term wearable device in this description is for ease of description and not intended to be limiting. Examples of wearable devices suitable for implementing the method 1000 include AR glasses 140 as described herein, as well as any form of AR/XR/VR devices including goggles. Various means for performing the operations of the method 1000 may include a processor (e.g., 310, 284, 802, 804) of the wearable device coupled to memory (e.g., 311, 342, 288) or from a remote source, such as a remote system (e.g., edge server 115) or external resources using a transceiver (e.g., 724, 866) and related components.

In block 1002, a processor of the wearable device may obtain a plurality of temperature measurements from a plurality of hardware components of the wearable device. Means for performing the operations of block 1002 may include a processor (e.g., 310, 284, 802, 804) coupled to memory (e.g., 311, 342, 288) or from a remote source, such as a remote system (e.g., edge server 115) or external resources using a transceiver (e.g., 724, 866) and related components.

In block 1004, the processor of the wearable device may transmit, from the UE to the network node (e.g., network node 120), the plurality of temperature measurements correlated to the plurality of hardware components. Means for performing the operations of block 1004 may include a processor (e.g., 722, 802, 804, 852) coupled to memory (e.g., 311, 342, 288) or from a remote source, such as a remote system (e.g., edge server 115) or external resources using a transceiver (e.g., 724, 866) and related components.

In block 1006, the processor of the wearable device may receive an instruction from the network node related to operations of an application executing on the processor of the UE. Means for performing the operations of block 1006 may include a processor (e.g., 722, 802, 804, 852) coupled to memory (e.g., 288, 311, 342) or from a remote source, such as a remote system (e.g., edge server 115) or external resources using a transceiver (e.g., 724, 866) and related components.

In block 1008, the processor of the wearable device may adjust an operating parameter of one or more compounds of the wearable device (e.g., processor clock rate, processor scheduling, compression rate, frame rate) based on the instruction received from the network node. Means for performing the operations of block 1008 may include a processor (e.g., 722, 802, 804, 852) coupled to memory (e.g., 288, 311, 342) or from a remote source, such as a remote system (e.g., edge server 115) or external resources using a transceiver (e.g., 724, 866) and related components.

In some embodiments as a part of the method 1000, the processor of the wearable device may adjust the operating parameter of the wearable device by receiving more rendered elements of the graphics from the network node In some embodiments as a part of the method 1000, the processor of the wearable device may adjust the operating parameter of the wearable device by rendering more elements of the graphics by a processor. In some embodiments as a part of the method 1000, the processor of the wearable device may adjust the operating parameter of the wearable device by rendering more elements of the graphics by the processor and receiving more rendered elements of the graphics from the network node. In some embodiments as a part of the method 1000, the processor of the wearable device may adjust the operation of the processor executing an XR application based on the instruction by adjusting processing of the data or graphics to be presented in the extended reality display.

The processor of the wearable device may adjust the operating parameter of the UE by performing at least one of: adjusting a downlink data transmission rate of a transceiver of the UE; adjusting a sampling rate of an inertial measurement unit of the UE; adjusting sensitivity of the inertial measurement unit of the UE; adjusting an output resolution of the inertial measurement unit of the UE; adjusting gyroscope measurements of the inertial measurement unit of the UE; adjusting graphical display quality in a display of the UE; adjusting a graphical display area in the display of the UE; and adjusting video compression parameters including frame rate, a ratio of predictive frames to full frames, or compression block size.

Figure 11:
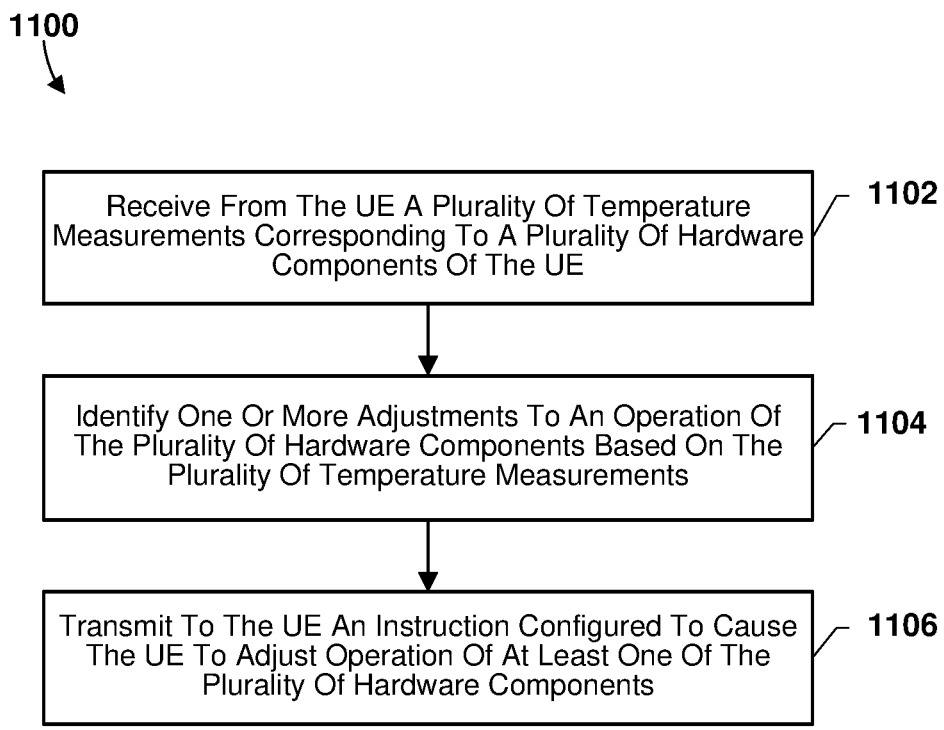
FIG. 11 is a process flow diagram illustrating an example process suitable for implementing various aspects herein.

FIG. 11 is a process flow diagram illustrating an example method 1100 that may be performed in an edge server (or remote server) for balancing processor load based on temperature constraints. With reference to FIGS. 1-11, the method 1100 may be performed by a processor (e.g., 350, 901) of an edge server or remote server (e.g., 100, 115), which may be configured to perform the operations by processor-executable instructions stored in a non-transitory processor-readable medium (e.g., memory 342). Means for performing the operations of the method 1100 may include a processor (e.g., 350, 901) coupled to memory (e.g., 342) or from a remote source, such as a remote system (e.g., XR server 110) or external resources 868 using a transceiver (e.g., 866) and related components.

In block 1102, the edge server 115 or XR server 110 (or processor/transceiver thereof) may receive from the UE a plurality of temperature measurements corresponding to a plurality of hardware components of a wearable device, such as AR glasses 140. Means for performing the operations of block 1102 may include a processor (e.g., 350, 901) coupled to memory (e.g., 342) or from a remote source, such as a remote system (e.g., XR server 110) or external resources 868 using a transceiver (e.g., 866) and related components.

In block 1104, the edge server 115 or XR server 110 (or processor/transceiver thereof) may identify one or more adjustments to an operation of the plurality of hardware components of the wearable device, such as AR glasses 140 based on the plurality of temperature measurements. Means for performing the operations of block 1104 may include a processor (e.g., 350, 901) coupled to memory (e.g., 342) or from a remote source, such as a remote system (e.g., XR server 110) or external resources (e.g., 868) using a transceiver (e.g., 866) and related components.

In block 1106, the edge server 115 or XR server 110 (or processor/transceiver thereof) may transmit to the wearable device, such as AR glasses 140 an instruction configured to cause the wearable device to adjust operation of at least one of the plurality of hardware components. In some circumstances, the instruction to adjust operations of the wearable device may include configuring the wearable device to receive imagery that is rendered or at least partially rendered within the edge server 115 or XR server 110, thereby reducing the graphics processing load performed on the wearable device. In some circumstances, the instruction to adjust operations of the wearable device may include configuring the wearable device to receive AR media at a lower data rate or frame rate in order to reduce processing loads within the wearable device. Means for performing the operations of block 1106 may include a processor (e.g., 350, 901) coupled to memory (e.g., 342) or from a remote source, such as a remote system (e.g., XR server 110) or external resources (e.g., 868) using a transceiver (e.g., 866) and related components.

Various implementations illustrated and described are provided merely as examples to illustrate various features of the claims. However, features shown and described with respect to any given implementation are not necessarily limited to the associated implementation and may be used or combined with other embodiments that are shown and described. Further, the claims are not intended to be limited by any one example implementation. For example, one or more of the operations of the methods 1000 and 1100 may be performed in an order other than illustrated and described, including in parallel or as a combination of operations.

Implementation examples are described in the following paragraphs. While some of the following implementation examples are described in terms of example methods, further example implementations may include: the example methods discussed in the following paragraphs implemented by a wearable device or an edge server including a processor configured with processor-executable instructions to perform operations of the methods of the following implementation examples; the example methods discussed in the following paragraphs implemented by a wearable device or an edge server including means for performing functions of the methods of the following implementation examples; and the example methods discussed in the following paragraphs may be implemented as a non-transitory processor-readable storage medium having stored thereon processor-executable instructions configured to cause a processor of a wearable device or an edge server to perform operations of the methods of the following implementation examples.

Example 1. A method Example 1. A method performed by a processor of a wearable device receiving a data stream from a network node, including: obtaining a plurality of temperature measurements from a plurality of hardware components of the wearable device; transmitting, from the wearable device to the network node, the plurality of temperature measurements correlated to the plurality of hardware components; receiving an instruction from the network node related to operations of an application executing on the processor of the wearable device; and adjusting an operating parameter of the wearable device based on the instruction received from the network node.

Example 2. The method of example 1, in which: the application executing on the processor of the wearable device is using a data stream; the instruction received from the network node adjusts execution of the application; and adjusting the operating parameter of the wearable device based on the instruction received from the network node includes adjusting an operation of the processor executing the application based on the instruction.

Example 3. The method of example 2, in which the application executing on the processor displays graphics rendered in the wearable device based on the data stream received from the network node.

Example 4. The method of example 3, in which adjusting the operating parameter of the wearable device includes one of: receiving more rendered elements of the graphics from the network node; rendering more elements of the graphics by the processor; or rendering more elements of the graphics by the processor and receiving more rendered elements of the graphics from the network node.

Example 5. The method of any of examples 1-4, in which: the application executing on the processor of the wearable device is an extended reality application; the data stream received from the network node includes data or graphics to be presented in an extended reality display; and adjusting the operation of the processor executing the application based on the instruction includes adjusting processing of the data or graphics to be presented in the extended reality display.

Example 6. The method of any of examples 1-5, in which adjusting the operating parameter of the wearable device includes at least one of: adjusting a downlink data transmission rate of a transceiver of the wearable device; adjusting a sampling rate of an inertial measurement unit of the wearable device; adjusting sensitivity of the inertial measurement unit of the wearable device; adjusting an output resolution of the inertial measurement unit of the wearable device; adjusting gyroscope measurements of the inertial measurement unit of the wearable device; adjusting graphical display quality in a display of the wearable device; adjusting a graphical display area in the display of the wearable device; or adjusting video compression parameters including frame rate, a ratio of predictive frames to full frames, or compression block size.

Example 7. The method of any of examples 1-6, in which the transmitting the plurality of temperature measurements includes: transmitting the plurality of temperature measurements via at least one control message of a Wi-Fi protocol; or transmitting the plurality of temperature measurements via at least one radio resource control message of a 5G protocol.

Example 8. The method of any of examples 1-7, in which the transmitting the plurality of temperature measurements includes: transmitting the plurality of temperature measurements via at least one control message, each of the at least one control message including a control bit for indicating to the network node that the at least one control message contains the plurality of temperature measurements in a payload, and each of the at least one control message including a plurality of component identifiers mapped to the plurality of temperature measurements.

Example 9. A method performed by an edge server streaming data to a wearable device, including: receiving from the wearable device a plurality of temperature measurements corresponding to a plurality of hardware components of the wearable device; identifying one or more adjustments to an operation of the plurality of hardware components based on the plurality of temperature measurements; and transmitting to the wearable device an instruction configured to cause the wearable device to adjust operation of at least one of the plurality of hardware components.

Example 10. The method of example 9, further including: computing, at the edge server, at least one aspect of a graphical display of the wearable device based on the plurality of temperature measurements.

Example 11. The method of example 10, further including: predicting a temperature value of at least one of the plurality of hardware components of the wearable device; and computing, at the edge server, at least another aspect of the graphical display of the wearable device based on the predicted temperature value, the predicted temperature value being separate from the plurality of temperature measurements.

Example 12. The method of any of examples 9-11, further including: adjusting at least one parameter of a communication connection between the edge server and the wearable device; or adjusting at least one parameter of graphical rendering performed at the edge server for the wearable device.

Example 13. The method of any of examples 9-12, in which the plurality of temperature measurements include individual temperature measurements for each of the plurality of hardware components of the wearable device.

Example 14. The method of any of examples 9-13, in which the plurality of temperature measurements is received in one or more control message packets via a 5G protocol-based wireless link or a Wi-Fi protocol-based wireless link.

Example 15. The method of any of examples 9-14, further including executing a application programming interface (API) for balancing processing burdens between the edge server and the wearable device based on the received plurality of temperature measurements.

Example 16. The method of any of examples 9-15, in which the one or more adjustments are configured for execution at the wearable device to control a first hardware component of the plurality of hardware components to reduce thermal emissions at the first hardware component, and in which the one or more instructions are based on a comparison of a temperature value for the first hardware component, received with the plurality of temperature measurements, with a temperature threshold for the first hardware component.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A wearable device, comprising:
a processor configured to:
obtain a plurality of temperature measurements from a plurality of hardware components of the wearable device;
transmit, to a network node remote from the wearable device, the plurality of temperature measurements correlated to the plurality of hardware components;
transmit, to an edge server via the network node, the plurality of temperature measurements from the plurality of hardware components;
receive an instruction from the network node or the edge server related to operations of an application executing on the processor of the wearable device; and
adjust an operating parameter of the wearable device based on the instruction received from the network node or the edge server.

2. The wearable device of claim 1, further comprising:
requesting an adjustment of a timing of a data stream from the network node, wherein:
the application executing on the processor of the wearable device is using the data stream;
the instruction received from the network node adjusts execution of the application; and
the processor is further configured to adjust the operating parameter of the wearable device based on the instruction received from the network node by adjusting an operation of the processor executing the application based on the instruction.

3. The wearable device of claim 2, wherein:
the application executing on the processor of the wearable device is an extended reality application;
the data stream received from the network node includes data or graphics to be presented in an extended reality display; and
the processor is further configured to adjust the operation of the processor executing the application based on the instruction by adjusting processing of the data or graphics to be presented in the extended reality display.

4. The wearable device of claim 1, wherein the processor is further configured to adjust the operating parameter of the wearable device by at least one of:
adjusting a downlink data transmission rate of a transceiver of the wearable device;
adjusting a sampling rate of an inertial measurement unit of the wearable device;
adjusting sensitivity of the inertial measurement unit of the wearable device;
adjusting an output resolution of the inertial measurement unit of the wearable device;
adjusting gyroscope measurements of the inertial measurement unit of the wearable device;
adjusting graphical display quality in a display of the wearable device;
adjusting a graphical display area in the display of the wearable device; or
adjusting video compression parameters including frame rate, a ratio of predictive frames to full frames, or compression block size.

5. The wearable device of claim 1, wherein the processor is further configured to transmit the plurality of temperature measurements by:
transmitting the plurality of temperature measurements via at least one control message of a Wi-Fi protocol; or
transmitting the plurality of temperature measurements via at least one radio resource control message of a 5G protocol.

6. The wearable device of claim 1, wherein the processor is further configured to transmit the plurality of temperature measurements by:
transmitting the plurality of temperature measurements via at least one control message, each of the at least one control message including a control bit for indicating to the network node that the at least one control message contains the plurality of temperature measurements in a payload, and each of the at least one control message including a plurality of component identifiers mapped to the plurality of temperature measurements.

7. A method performed by a processor of a wearable device receiving a data stream from a network node, comprising:
obtaining a plurality of temperature measurements from a plurality of hardware components of the wearable device;
transmitting, from the wearable device to the network node remote from the wearable device, the plurality of temperature measurements correlated to the plurality of hardware components;
transmitting, to an edge server via the network node, the plurality of temperature measurements from the plurality of hardware components;
receiving an instruction from the network node or the edge server related to operations of an application executing on the processor of the wearable device; and
adjusting an operating parameter of the wearable device based on the instruction received from the network node or the edge server.

8. The method of claim 7, further comprising:
requesting an adjustment of a timing of a data stream from the network node, wherein:
the application executing on the processor of the wearable device is using the data stream;
the instruction received from the network node adjusts execution of the application; and
adjusting the operating parameter of the wearable device based on the instruction received from the network node comprises adjusting an operation of the processor executing the application based on the instruction.

9. The method of claim 8, wherein:
the application executing on the processor of the wearable device is an extended reality application;
the data stream received from the network node includes data or graphics to be presented in an extended reality display; and
adjusting the operation of the processor executing the application based on the instruction comprises adjusting processing of the data or graphics to be presented in the extended reality display.

10. The method of claim 7, wherein adjusting the operating parameter of the wearable device comprises at least one of:
adjusting a downlink data transmission rate of a transceiver of the wearable device;
adjusting a sampling rate of an inertial measurement unit of the wearable device;
adjusting sensitivity of the inertial measurement unit of the wearable device;
adjusting an output resolution of the inertial measurement unit of the wearable device;

adjusting gyroscope measurements of the inertial measurement unit of the wearable device;

adjusting graphical display quality in a display of the wearable device;

adjusting a graphical display area in the display of the wearable device; or adjusting video compression parameters including frame rate, a ratio of predictive frames to full frames, or compression block size.

11. The method of claim 7, wherein transmitting the plurality of temperature measurements comprises:

transmitting the plurality of temperature measurements via at least one control message of a Wi-Fi protocol; or transmitting the plurality of temperature measurements via at least one radio resource control message of a 5G protocol.

12. The method of claim 7, wherein transmitting the plurality of temperature measurements comprises:

transmitting the plurality of temperature measurements via at least one control message, each of the at least one control message including a control bit for indicating to the network node that the at least one control message contains the plurality of temperature measurements in a payload, and each of the at least one control message including a plurality of component identifiers mapped to the plurality of temperature measurements.

13. An edge server, comprising:

a memory including one or more server-executable instructions; and a server processor connected to the memory, wherein the server processor is configured with server-executable instructions to:

transmit a data stream to a wearable device via a network node, where the edge server and network node are remote from the wearable device;

receive, from the wearable device, a plurality of temperature measurements corresponding to a plurality of hardware components of the wearable device;

identify, at the edge server, one or more adjustments to operations of the plurality of hardware components based on the plurality of temperature measurements; and transmit to the wearable device an instruction configured to cause the wearable device to adjust operation of at least one of the plurality of hardware components.

14. The edge server of claim 13, wherein the edge server is further configured with server-executable instructions to:

compute at least one aspect of a graphical display of the wearable device based on the plurality of temperature measurements.

15. The edge server of claim 14, wherein the edge server is further configured with server-executable instructions to:

predict a temperature value of at least one of the plurality of hardware components of the wearable device; and compute at least another aspect of the graphical display of the wearable device based on the predicted temperature value, the predicted temperature value being separate from the plurality of temperature measurements.

16. The edge server of claim 13, wherein the edge server is further configured with server-executable instructions to:

adjust at least one parameter of a communication connection between the edge server and the wearable device; or adjust at least one parameter of graphical rendering performed at the edge server for display on the wearable device.

17. The edge server of claim 13, wherein the plurality of temperature measurements include individual temperature measurements for each of the plurality of hardware components of the wearable device.

18. The edge server of claim 13, wherein the plurality of temperature measurements is received in one or more control message packets via a 5G protocol-based wireless link or a Wi-Fi protocol-based wireless link.

19. The edge server of claim 13, wherein the edge server is further configured with server-executable instructions to execute a application programming interface (API) for balancing processing burdens between the edge server and the wearable device based on the received plurality of temperature measurements.

20. The edge server of claim 13, wherein the edge server is further configured with server-executable instructions to identify one or more adjustments to operations of the plurality of hardware components that are configured for execution at the wearable device to control a first hardware component of the plurality of hardware components to reduce thermal emissions at the first hardware component, wherein the one or more adjustments are based on a comparison of a temperature value for the first hardware component, received with the plurality of temperature measurements, with a temperature threshold for the first hardware component.

21. A method performed by an edge server streaming data to a wearable device, comprising:

transmitting a data stream to the wearable device via a network node, where the edge server and network node are remote from the wearable device;

receiving, from the wearable device via a network node, a plurality of temperature measurements corresponding to a plurality of hardware components of the wearable device;

identifying, at the edge server, one or more adjustments to an operation of the plurality of hardware components based on the plurality of temperature measurements; and transmitting to the wearable device an instruction configured to cause the wearable device to adjust operation of at least one of the plurality of hardware components.

22. The method of claim 21, further comprising:

computing, at the edge server, at least one aspect of a graphical display of the wearable device based on the plurality of temperature measurements.

23. The method of claim 22, further comprising:

predicting a temperature value of at least one of the plurality of hardware components of the wearable device; and computing, at the edge server, at least another aspect of the graphical display of the wearable device based on the predicted temperature value, the predicted temperature value being separate from the plurality of temperature measurements.

24. The method of claim 21, further comprising:

adjusting at least one parameter of a communication connection between the edge server and the wearable device; or adjusting at least one parameter of graphical rendering performed at the edge server for the wearable device.

25. The method of claim 21, wherein the plurality of temperature measurements include individual temperature measurements for each of the plurality of hardware components of the wearable device.

26. The method of claim 21, wherein the plurality of temperature measurements is received in one or more control message packets via a 5G protocol-based wireless link or a Wi-Fi protocol-based wireless link.

27. The method of claim 21, further comprising executing a application programming interface (API) for balancing processing burdens between the edge server and the wearable device based on the received plurality of temperature measurements.

28. The method of claim 21, wherein the one or more adjustments are configured for execution at the wearable device to control a first hardware component of the plurality of hardware components to reduce thermal emissions at the first hardware component, and wherein the one or more instructions are based on a comparison of a temperature value for the first hardware component, received with the plurality of temperature measurements, with a temperature threshold for the first hardware component.

* * * * *